United States Patent
Ono

(10) Patent No.: US 10,027,918 B2
(45) Date of Patent: Jul. 17, 2018

(54) IMAGING MODULE THAT CAPTURES SUBJECT IMAGES HAVING DIFFERENT CHARACTERISTICS AND IMAGING DEVICE

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 89 days.

(21) Appl. No.: 15/163,755

(22) Filed: May 25, 2016

(65) Prior Publication Data

US 2016/0269667 A1  Sep. 15, 2016

Related U.S. Application Data

(63) Continuation of application No. PCT/JP2014/082391, filed on Dec. 8, 2014.

(30) Foreign Application Priority Data

Dec. 20, 2013 (JP) .................................. 2013-263660

(51) Int. Cl.
*H04N 5/378* (2011.01)
*G02B 13/00* (2006.01)
(Continued)

(52) U.S. Cl.
CPC ........... *H04N 5/378* (2013.01); *G02B 3/0056* (2013.01); *G02B 13/00* (2013.01); *G02B 13/04* (2013.01);
(Continued)

(58) Field of Classification Search
CPC ............. H04N 5/23212; H04N 5/3696; H04N 5/2254; H04N 5/23296; H04N 5/378; G02B 27/0172; G02B 7/34
See application file for complete search history.

(56) References Cited

U.S. PATENT DOCUMENTS

2009/0135502 A1* 5/2009 Border ............... G02B 17/0896
359/721
2010/0157094 A1* 6/2010 Takamiya ................ G02B 7/28
348/229.1
(Continued)

FOREIGN PATENT DOCUMENTS

JP  H05-83746 U  11/1993
JP  2010-239337 A  10/2010
(Continued)

OTHER PUBLICATIONS

Written Opinion of PCT/JP2014/082391 dated Jan. 20, 2015.
(Continued)

*Primary Examiner* — Twyler Haskins
*Assistant Examiner* — Carramah J Quiett
(74) *Attorney, Agent, or Firm* — Studebaker & Brackett PC

(57) ABSTRACT

The present invention relates to an imaging device including a multi-lens including a central optical system (wide-angle lens) and an annular optical system (telescopic lens) which have a common optical axis, an image sensor, and an array lens provided on the incidence surface side of the image sensor and including microlenses (pupil imaging lens). In a preferred aspect of the present invention, two images having different characteristics are generated based on a pupil image of each unit block including 3×3 light reception cells assigned to each of the microlenses of the array lens. The unit block has eight surrounding light reception cells that correspond to one of the two images, and the eight surrounding light reception cells in the unit block are configured to output RGB pixel signals in all wavelength regions necessary for generating this one image.

20 Claims, 22 Drawing Sheets

(51) Int. Cl.
  *G02B 13/04*   (2006.01)
  *G02B 17/08*   (2006.01)
  *G03B 15/00*   (2006.01)
  *H04N 9/07*    (2006.01)
  *H04N 5/225*   (2006.01)
  *H04N 5/345*   (2011.01)
  *H04N 9/04*    (2006.01)
  *G03B 17/00*   (2006.01)
  *G02B 3/00*    (2006.01)

(52) U.S. Cl.
  CPC ..... *G02B 17/0808* (2013.01); *G02B 17/0856* (2013.01); *G03B 15/00* (2013.01); *G03B 17/00* (2013.01); *H04N 5/2254* (2013.01); *H04N 5/2259* (2013.01); *H04N 5/3458* (2013.01); *H04N 9/045* (2013.01); *H04N 9/07* (2013.01)

(56) References Cited

U.S. PATENT DOCUMENTS

2010/0238330 A1   9/2010   Hirota
2013/0093944 A1   4/2013   Fukami
2013/0135448 A1   5/2013   Nagumo et al.

FOREIGN PATENT DOCUMENTS

| JP | 2012-247645 A | 12/2012 |
| JP | 2012-253670 A | 12/2012 |
| JP | 2013-090059 A | 5/2013  |
| JP | 2013-115532 A | 6/2013  |

OTHER PUBLICATIONS

International Search Report of PCT/JP2014/082391 dated Jan. 20, 2015.

The extended European search report issued by the European Patent Office dated Nov. 16, 2016, which corresponds to European Patent Application No. 14871445.4-1902 and is related to U.S. Appl. No. 15/163,755.

\* cited by examiner

FIG. 5
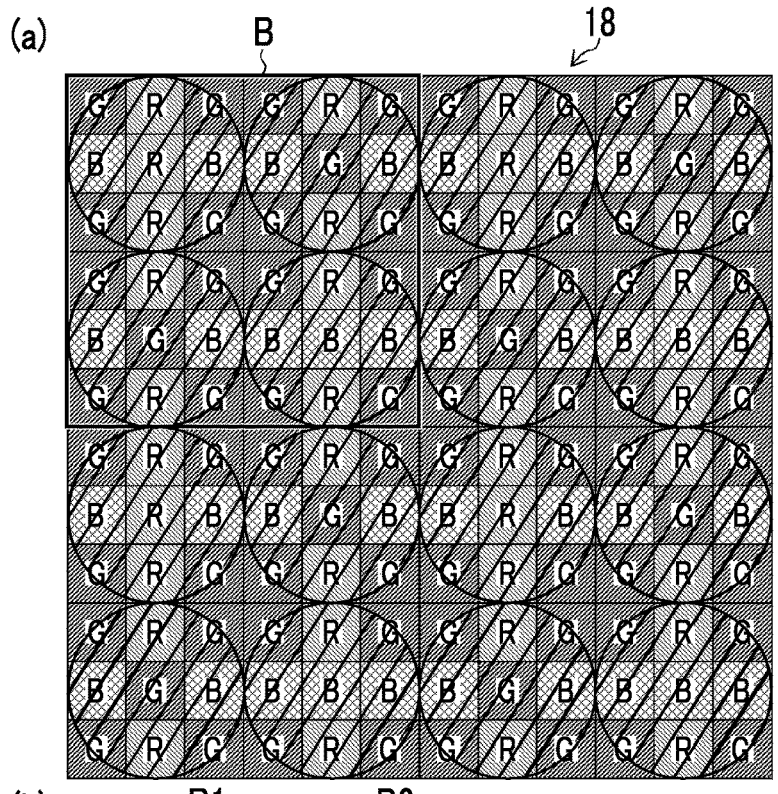
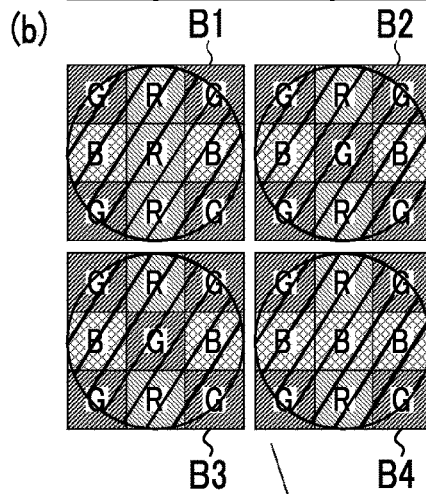
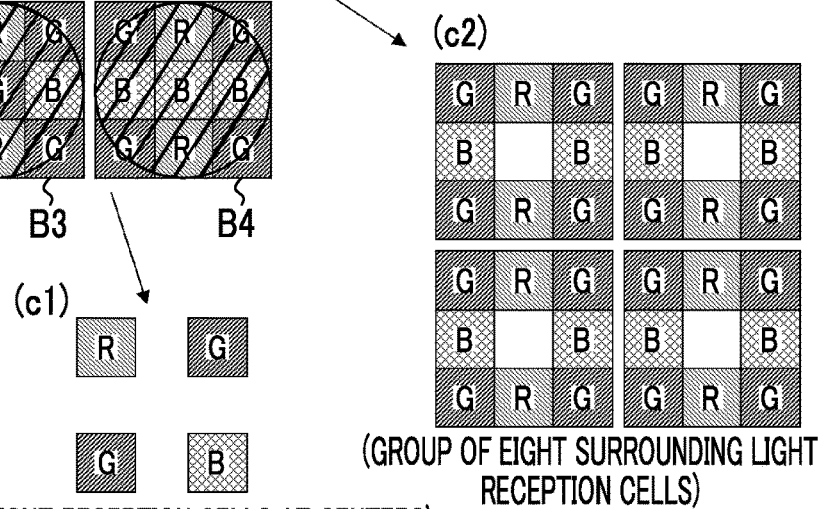
(c1) (GROUP OF LIGHT RECEPTION CELLS AT CENTERS)
(c2) (GROUP OF EIGHT SURROUNDING LIGHT RECEPTION CELLS)

FIG. 6
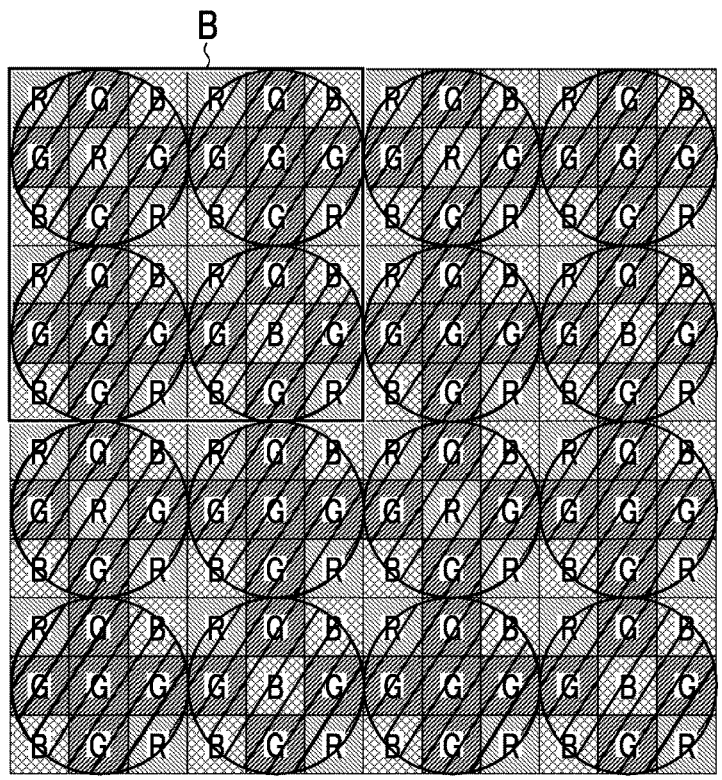
(a)
(b)
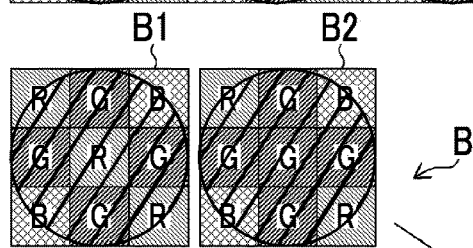
(c1)
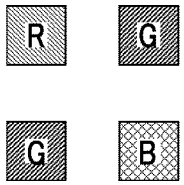
(GROUP OF LIGHT RECEPTION CELLS AT CENTERS)
(c2)
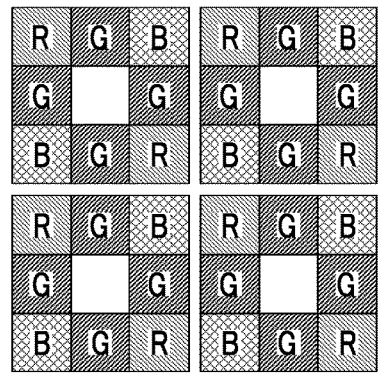
(GROUP OF EIGHT SURROUNDING LIGHT RECEPTION CELLS)

FIG. 7
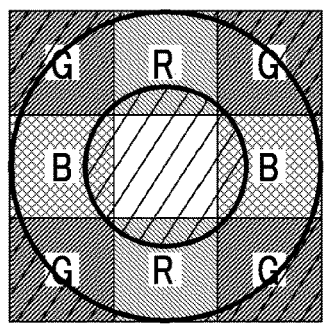
(a)
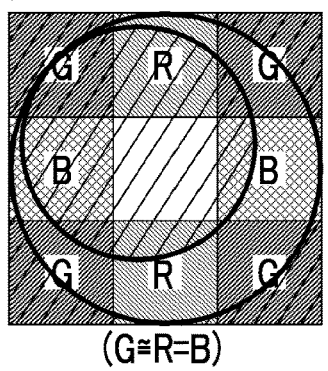
(b)
(G≅R=B)
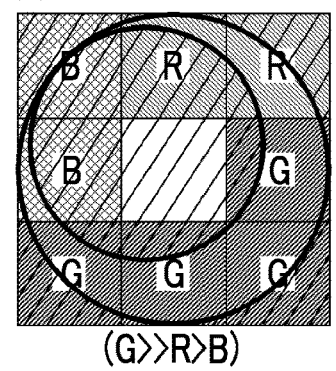
(d)
(G>>R>B)
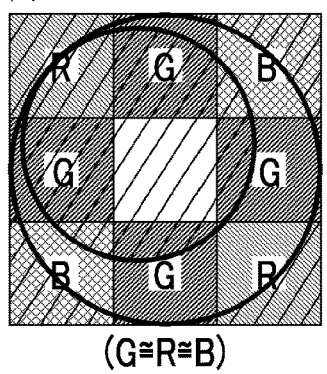
(c)
(G≅R≅B)
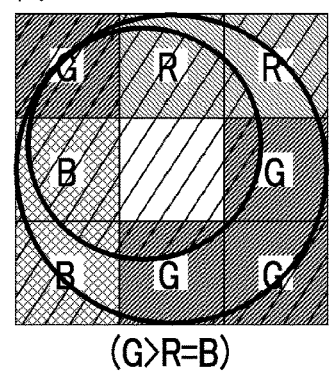
(e)
(G>R=B)

FIG. 8
(a)
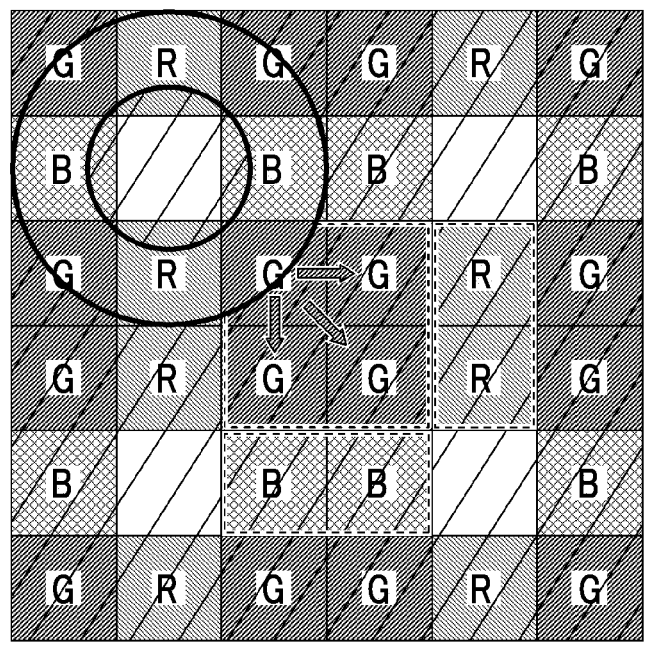
(b)
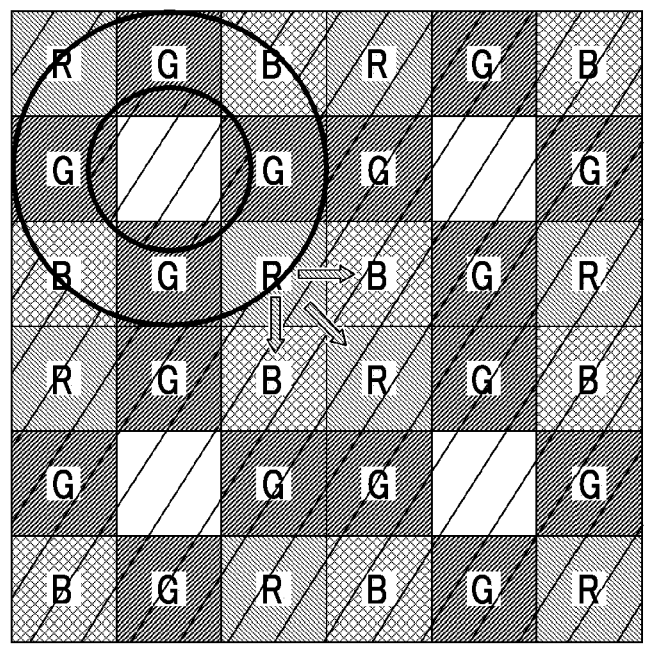

FIG. 10
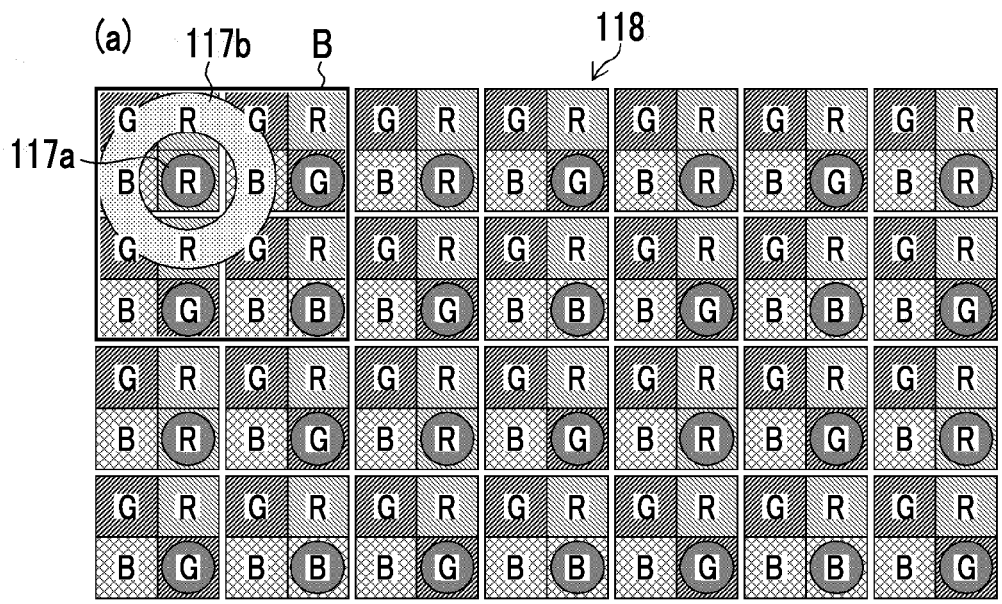
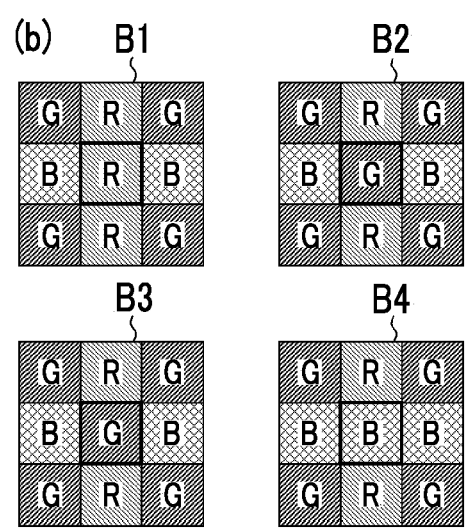

FIG. 11
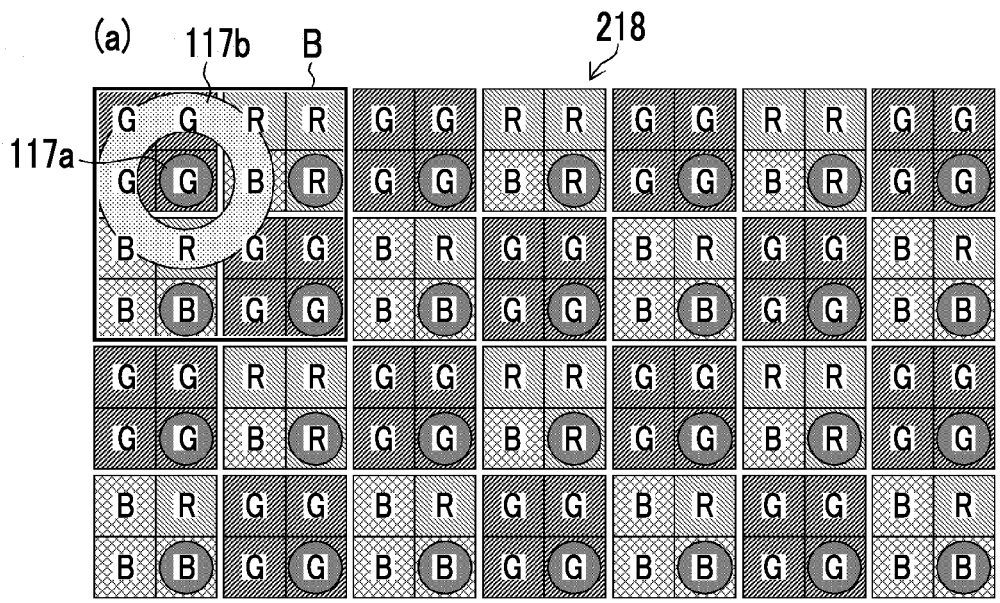
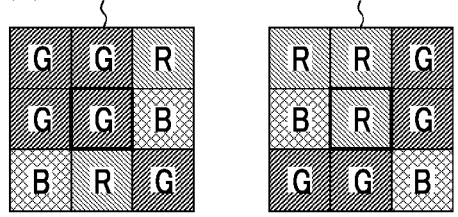
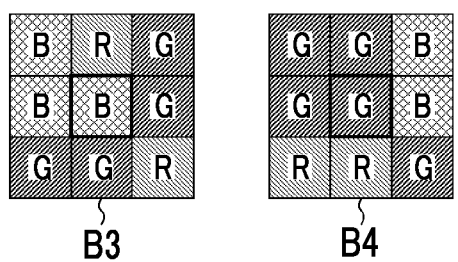

FIG. 13
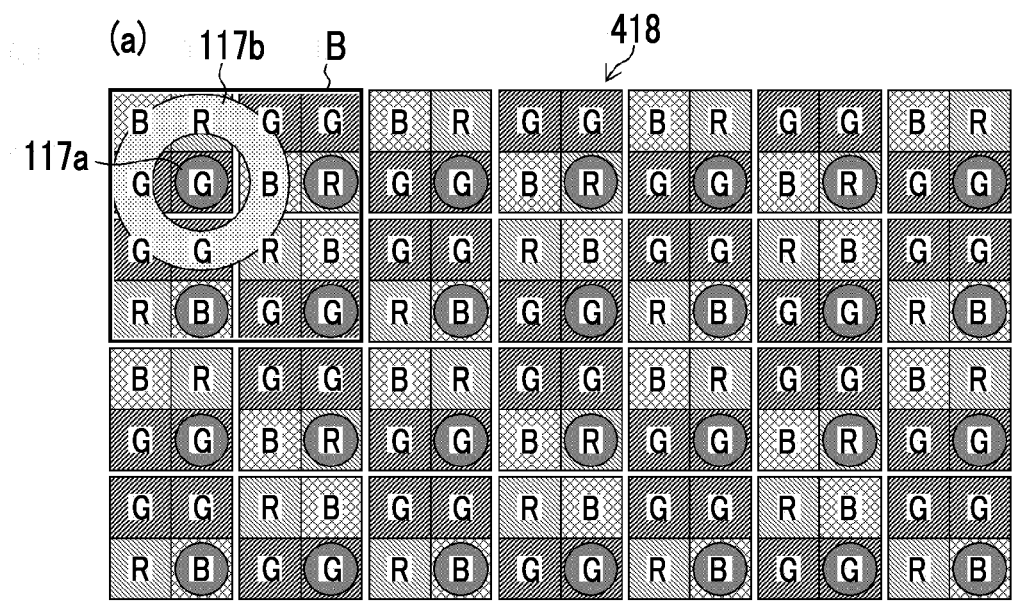
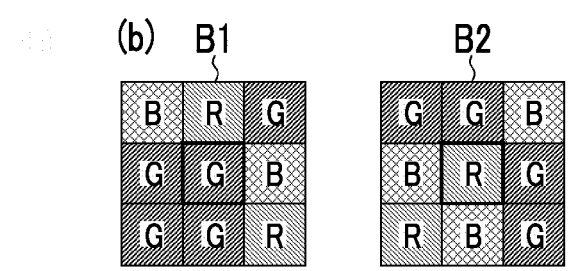
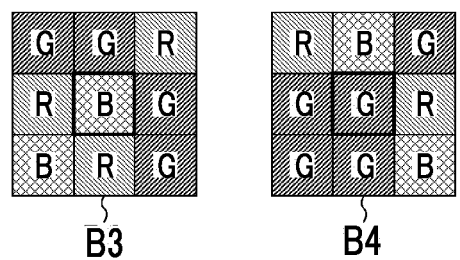

FIG. 14
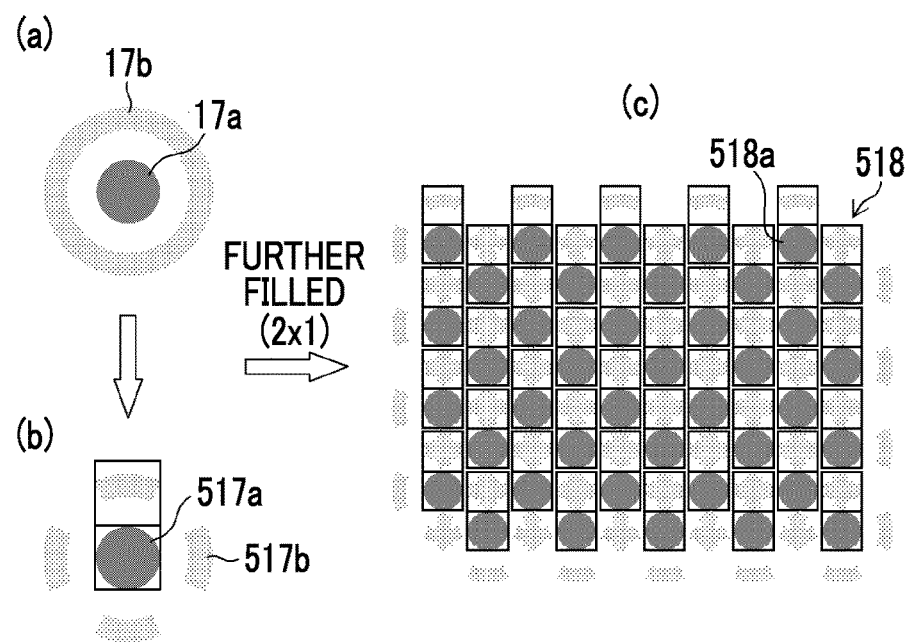
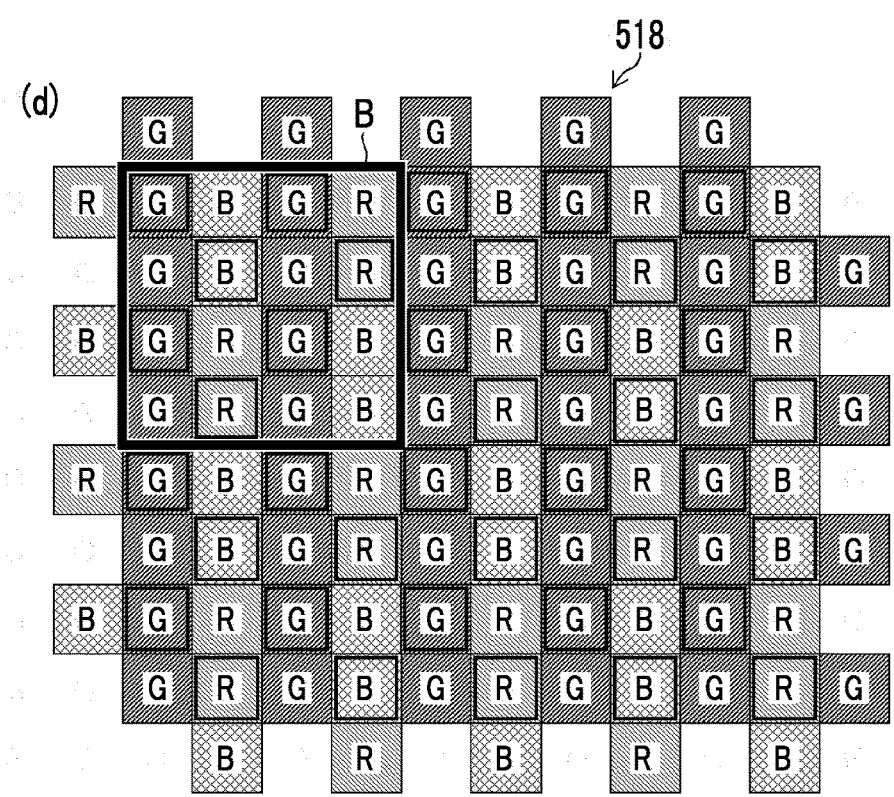

FIG. 16
(a) 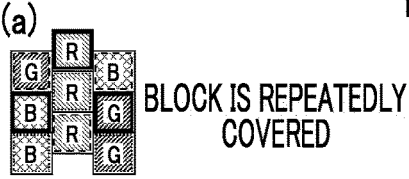 BLOCK IS REPEATEDLY COVERED
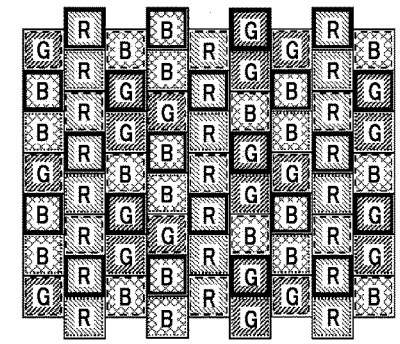
(b) BLOCK IS REPEATEDLY COVERED
(c) BLOCK IS REPEATEDLY COVERED
(d)  BLOCK IS REPEATEDLY COVERED
(e) BLOCK IS REPEATEDLY COVERED
(f)  BLOCK IS REPEATEDLY COVERED
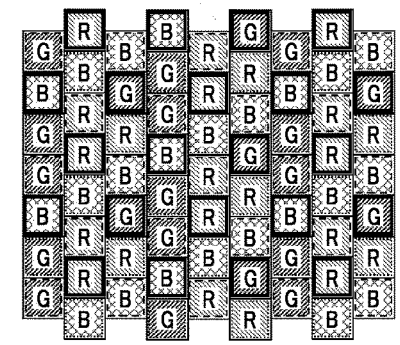

FIG. 24
(a)
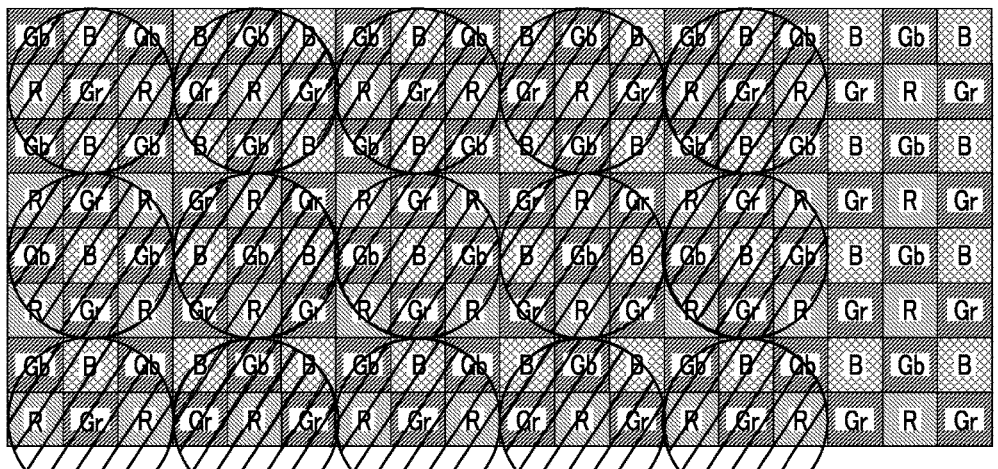
COLOR FILTER ARRAY OF IMAGE SENSOR = GENERAL BAYER ARRAY
(b)
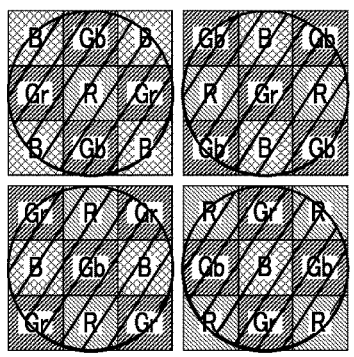
3×3 LIGHT RECEPTION CELLS ARE ASSIGNED TO ONE MICROLENS
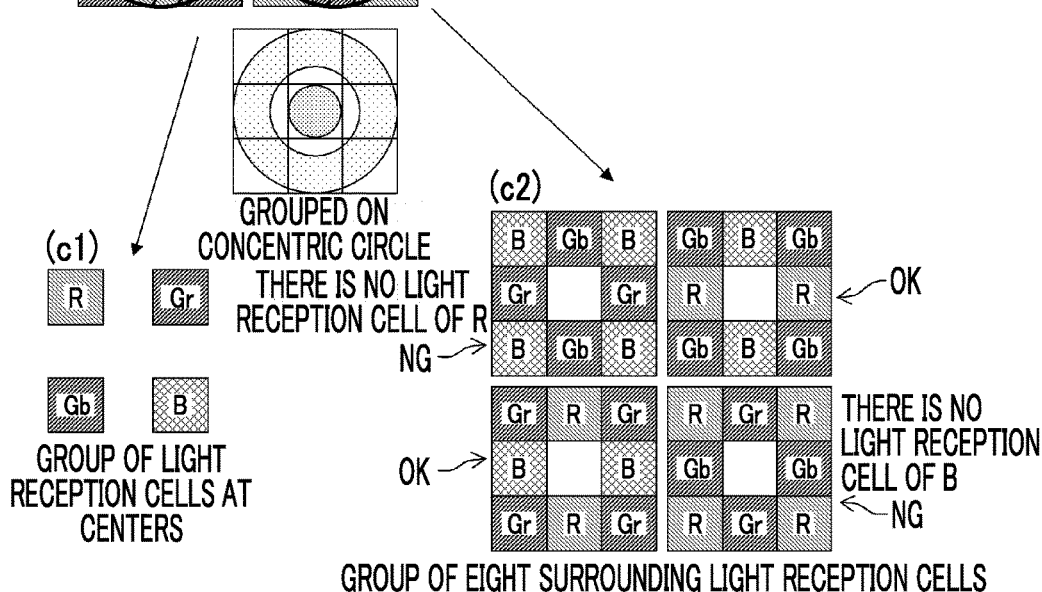
(c1) GROUP OF LIGHT RECEPTION CELLS AT CENTERS
GROUPED ON CONCENTRIC CIRCLE
(c2) THERE IS NO LIGHT RECEPTION CELL OF R — NG
OK
THERE IS NO LIGHT RECEPTION CELL OF B — NG
GROUP OF EIGHT SURROUNDING LIGHT RECEPTION CELLS

IMAGING MODULE THAT CAPTURES SUBJECT IMAGES HAVING DIFFERENT CHARACTERISTICS AND IMAGING DEVICE

CROSS-REFERENCE TO RELATED APPLICATIONS

The present application is a Continuation of PCT International Application No. PCT/JP2014/082391 filed on Dec. 8, 2014 claiming priority under 35 U.S.C. § 119(a) to Japanese Patent Application No. 2013-263660 filed on Dec. 20, 2013. Each of the above applications is hereby expressly incorporated by reference, in their entirety, into the present application.

BACKGROUND OF THE INVENTION

1. Field of the Invention

The present invention relates to an imaging module and an imaging device, and particularly, to an imaging module and an imaging device capable of simultaneously capturing a plurality of images having different characteristics.

2. Description of the Related Art

Conventionally, an imaging device that comprises an imaging optical system 1 including a central optical system (a wide-angle lens) 1a in a central portion and an annular optical system (telescopic lens) 1b in a portion surrounding the central optical system having different characteristics from the central optical system 1a, which are arranged on the same optical axis, an image sensor 3, and an array lens 2 including a plurality of microlenses (pupil imaging lenses) arranged on the incidence surface side of the image sensor 3, which forms a pupil image of the imaging optical system on the image sensor 3 using each microlens, as illustrated in FIG. 20, has been proposed (JP2012-253670A).

An image plane of the imaging optical system 1 is on the array lens 2, and the array lens 2 forms a pupil image of the imaging optical system 1 on the image sensor 3.

FIG. 21 illustrates one light reception cell 3a on the image sensor 3, and the pupil image of the imaging optical system 1 that one microlens of the array lens 2 forms on the image sensor 3. This pupil image includes a central pupil image (wide-angle lens component) corresponding to the central optical system 1a, and an annular pupil image (telescopic lens component) corresponding to the annular optical system 1b.

Portion (a) of FIG. 22 illustrates an example in which 5×5 light reception cells 3a of the image sensor 3 are assigned per microlens.

As illustrated in portion (a) of FIG. 22, in every group of 5×5 (=25) light reception cells, a central pupil image (wide-angle lens component) is received by the light reception cell in the central portion, and an annular pupil image (telescopic lens component) is received by the light reception cells in the surrounding portion.

In every group of 25 light reception cells, an image signal of one pixel of a wide-angle image is generated from the light reception cell receiving a wide-angle lens component and, similarly, an image signal of one pixel of a telescopic image is generated from the light reception cell receiving a telescopic lens component. Accordingly, a wide-angle image corresponding to the wide-angle lens and a telescopic image corresponding to the telescopic lens are obtained, as illustrated in portion (b) and portion (c) of FIG. 22.

In the example illustrated in FIG. 22, a relationship between the number of light reception cells of the image sensor 3 and the number of pixels of the wide-angle image and the telescopic image obtained from the image sensor 3 is the number of light reception cells:the number of pixels (×the number of images)=25:1 (×2).

When the 5×5 light reception cells 3a of the image sensor 3 are assigned to each microlens as illustrated in FIG. 22, there is a problem in that the number of pixels of images (a wide-angle image and a telescopic image in the above example) having different characteristics obtained from the image sensor 3 is greatly decreased as compared to the number of light reception cells of the image sensor 3.

A simplest method of suppressing a decrease in the number of pixels of the images having different characteristics obtained from the image sensor 3 is to reduce the number (assignment number) of light reception cells assigned to each microlens. It is possible to increase the number of pixels of images having different characteristics that can be taken out, by an amount corresponding to a reduction in the assignment number.

Portion (a) and portion (b) of FIG. 23 illustrate an example in which 5×5 light reception cells 3a of the image sensor 3 are assigned to each microlens, and an example in which 3×3 light reception cells 3a are assigned, respectively.

That is, in a case in which the imaging optical system is concentrically divided, the assignment number of the reception cells that can be assigned to each microlens of the array lens is limited to 3×3. In this case, a relationship between the number of light reception cells of the image sensor 3 and the number of pixels of a wide-angle image or a telescopic image obtained from the image sensor 3 is the number of light reception cells:the number of pixels=9:1.

In JP2012-253670A, there is a description that color filters are arranged in a light reception element in a predetermined pattern in order to capture a color image, but there is no description of a specific color filter array.

Meanwhile, in JP2013-90059A and JP2013-115532A, an imaging device that uses a general imaging lens and an array lens (microlens array) arranged on the incidence surface side of the image sensor, and acquires a pixel signal based on the amount of received light by causing rays to be incident on each light reception cell of the image sensor while dividing rays passing through the imaging lens into rays from a plurality of viewpoints using the lens array is described.

In JP2013-90059A and JP2013-115532A, there is a description that rays passing through one microlens are received by the 3×3 light reception cells, and there is a description that color filters in a Bayer array are provided on the image sensor, and the color filter of one of red (R), green (G), and blue (B) is provided in each light reception cell.

Nine viewpoint images can be generated by extracting an output signal of the light reception cell in the same position from the 3×3 light reception cells corresponding to each microlens and reconstructing the image, but the viewpoint image generated in this way becomes a color image (mosaic image) of a Bayer array (see FIG. 11 in JP2013-90059A).

An example of pupil division device may include a device that causes a light beam passing through respective areas having different characteristics of a multi-lens to be incident on different reception cells by a microlens provided in each light reception cell and a light shielding mask (JP2012-253670A).

SUMMARY OF THE INVENTION

Now, an imaging device having a configuration in which an image sensor having a general Bayer array as described in JP2013-90059A and JP2013-115532A is applied and 3×3 light reception cells are assigned to one microlens, as illustrated in portion (a) of FIG. 24, is considered in the imaging device described in JP2012-253670A. An imaging device having this configuration is not known.

An image sensor and an array lens illustrated in portion (a) of FIG. 24 are configured such that 6×6 light reception cells in a lattice shape (a 2×2 array lens) are set as a basic block, and this basic block is repeatedly arranged in a horizontal direction and a vertical direction.

Portion (b) of FIG. 24 illustrates a basic block. The basic block includes four unit blocks each including one microlens, and 3×3 light reception cells per microlens.

Portion (c1) and portion (c2) of FIG. 24 respectively illustrate a group of light reception cells at centers of unit blocks (3×3) (light reception cells on which a light beam passing through the central optical system 1a illustrated in FIG. 20 is incident) and a group of eight surrounding light reception cells (light reception cells on which a light beam passing through the annular optical system 1b illustrated in FIG. 20 is incident).

As illustrated in portion (c1) of FIG. 24, an image of the group of light reception cells at the centers becomes a mosaic image of the Bayer array. Accordingly, it is possible to obtain a color image without problems by performing demosaic processing (also referred to as a synchronization process) on the mosaic image of the Bayer array.

On the other hand, as illustrated in portion (c2) of FIG. 24, a group of eight surrounding light reception cells includes all of eight light reception cells including all light reception cells of RGB, eight light reception cells without the light receiving cell of R, and eight light reception cells without the light receiving cell of B. This arrangement of light reception cells of RGB is unbalanced.

Specifically, the eight surrounding light reception cells of the 3×3 light reception cells in which the light reception cell at a center is the light reception cells of G include two light reception cells of R, four light reception cells of G and two light reception cells of B, and there is color information of all of RGB.

Meanwhile, the eight surrounding light reception cells among the 3×3 light reception cells in which the light reception cell at the center is R include four light reception cells of G and four light reception cells of B, and do not include a light reception cell of R. Similarly, the eight surrounding light reception cells among the 3×3 light reception cells in which the light reception cell at the center is B include four light reception cells of R and four light reception cells of G and do not include a light reception cell of B.

Therefore, a problem is generated in that, in the eight surrounding light reception cells among the 3×3 light reception cells that do not include the light reception cell of R or the light reception cell of B, a process such as complementing using the light reception cell of R or the light reception cell of B acquired in the adjacent unit block is required, which consumes time, and resolution performance of the image generated by the group of eight surrounding light reception cells is degraded.

Further, a problem is generated in that, in a case in which the imaging optical system is concentrically divided as described above, the assignment number of light reception cells that can be assigned to each microlens of the array lens is limited to 3×3, and the number of pixels of the simultaneously captured images having different characteristics is reduced.

The present invention has been made in view of such circumstances, and an object thereof is to provide an imaging module and an imaging device capable of achieving improvement of the image quality and the resolution of a plurality of images having different characteristics that are captured simultaneously.

In order to achieve the above object, an imaging module according to an aspect of the present invention is an imaging module that simultaneously captures X (X is an integer equal to or greater than 2) subject images having different characteristics, and outputs pixel signals in a plurality of wavelength regions for at least one of the X subject images, the imaging module comprising: a multi-lens that has X areas on which subject light is incident, and causes the subject images having different characteristics to be formed to overlap in the same image plane in each of the X areas; a pupil division device configured to divide a pupil image of the multi-lens into the respective X areas; and Y (Y is an integer equal to or greater than X+1) photoelectric converters arranged corresponding to X light reception areas that respectively receive X pupil images divided by the pupil division device, wherein a plurality of photoelectric converters are arranged in at least one of the X light reception areas, and the plurality of photoelectric converters arranged in one light reception area output the pixel signals in the plurality of wavelength regions.

According to an aspect of the present invention, the pupil images of the multi-lens having different characteristics for each of the X areas, which are the X pupil images divided by the pupil division device, are incident on the Y (Y is an integer equal to or greater than X+1) photoelectric converters arranged corresponding to the X light reception areas. Since the plurality of photoelectric converters are arranged in at least one of the X light reception areas and the plurality of photoelectric converters output the pixel signals in the plurality of wavelength regions, it is possible to acquire the pixel signals in the plurality of wavelength regions from the plurality of photoelectric converters corresponding to one pupil image with respect to at least one of the X simultaneously captured images having different characteristics, and to improve resolution per pixel.

In the imaging module according to another aspect of the present invention, it is preferable for the plurality of photoelectric converters arranged in the light reception area to output pixel signals in all wavelength regions necessary for generation of pixels constituting an image composed of information of the plurality of wavelength regions.

Since the plurality of photoelectric converters arranged in one light reception area output the pixel signals in all of the wavelength regions necessary for generation of the pixels constituting the image composed of information of the plurality of wavelength regions, it is possible to obtain an image signal of one pixel subjected to demosaic processing using only the pixel signals from the plurality of photoelectric converters arranged on one light reception area with respect to at least one of the X images.

Conversely, in a case in which the pixel signals of all the wavelength regions necessary for generation of the pixels constituting the image composed of information of the plurality of wavelength regions are not included in the plurality of pixel signals output from the plurality of photoelectric converters arranged in one light reception area (in a case in which pixel signals of a specific wavelength region is missing), it is necessary to interpolate pixel signals (pixel signals in a specific wavelength region) output from the Y surrounding photoelectric converters to generate the pixel signal in the specific wavelength region. In this case, although a problem is generated in that the resolution (the actual number of pixels) of an output image is degraded, it is possible to solve such a problem according to another aspect of the present invention.

In the imaging module according to yet another aspect of the present invention, it is preferable that the pupil division device is an array lens including two-dimensionally arranged microlenses, the array lens being arranged on the incidence surface side of the photoelectric converters and causing the pupil image of the multi-lens to be incident on the Y photoelectric converters with the respective microlenses.

In the imaging module according to another aspect of the present invention, it is preferable that when the pupil division device and the Y photoelectric converters are set as a unit block, the plurality of photoelectric converters arranged in the light reception area include two or more photoelectric converters that output pixel signals in the same wavelength region, and the two or more photoelectric converters are arranged at positions symmetrical to a center of the unit block.

In the imaging module according to yet another aspect of the present invention, the plurality of photoelectric converters arranged in the light reception area output pixel signals in respective wavelength regions of red (R), green (G), and blue (B). Accordingly, it is possible to acquire all of color information from the plurality of photoelectric converters arranged in one light reception area, and to generate a high-definition color images.

In the imaging module according to yet another aspect of the present invention, it is preferable for the multi-lens to include a first optical system at a center, and a second optical system provided in a portion surrounding the first optical system and having different characteristics from the first optical system. The multi-lens including the first optical system at the center and the second optical system provided in the portion surrounding the first optical system has superior lens performance than, for example, an imaging optical system including up and down divided optical systems.

In the imaging module according to yet another aspect of the present invention, one of the first optical system and the second optical system in the multi-lens is a wide-angle optical system, and the other is a telescopic optical system. Accordingly, it is possible to simultaneously acquire the wide-angle image and the telescopic image through onetime imaging.

In the imaging module according to yet another aspect of the present invention, it is preferable that the first optical system of the multi-lens is a circular central optical system, and the second optical system is an annular optical system concentrically arranged with respect to the central optical system.

In the imaging module according to yet another aspect of the present invention, it is preferable that the first optical system of the multi-lens is a circular central optical system, and the second optical system is an annular optical system arranged concentrically with respect to the central optical system; when the pupil division device and the Y photoelectric converters are set as a unit block, the unit block includes 3×3 photoelectric converters arranged in a lattice shape; a central pupil image corresponding to the central optical system is incident on the photoelectric converter at a center of the unit block; and an annular pupil image corresponding to the annular optical system is incident on eight surrounding photoelectric converters of the unit block.

In the imaging module according to yet another aspect of the present invention, it is preferable that the photoelectric converter at the center of the unit block outputs any one of pixel signals in the wavelength regions of red (R), green (G), and blue (B), and photoelectric converters at centers of a plurality of unit blocks are periodically arranged as photoelectric converters that output the pixel signals in the wavelength regions of R, G, and B. Accordingly, the pixel signal output from the photoelectric converter at the center among the 3×3 photoelectric converters includes pixel signals in the wavelength regions of R, G, and B, and it is possible to obtain the pixel signals in all the wavelength regions necessary for generation of one image.

In the imaging module according to yet another aspect of the present invention, it is preferable for the eight surrounding photoelectric converters of the unit block to include four photoelectric converters that output pixel signals in the wavelength region of G, two photoelectric converters that output pixel signals in the wavelength region of R, and two photoelectric converters that output pixel signals in the wavelength region of B. Accordingly, a ratio of the numbers of pixel signals of RGB becomes 1:2:1, and it is possible to arrange a large number of photoelectric converters of G contributing most to obtaining a luminance signal.

In the imaging module according to yet another aspect of the present invention, it is preferable for an image sensor to be configured such that 6×6 photoelectric converters arranged in a lattice shape are set as a basic block, and the basic block is repeatedly arranged in horizontal and vertical directions. Since the basic block of the 6×6 photoelectric converters is repeatedly arranged in the horizontal and vertical directions, it is possible to perform a process according to a repetitive pattern when performing image processing such as demosaic processing at a subsequent stage.

In the imaging module according to yet another aspect of the present invention, it is preferable for the array lens to cause adjacent pupil images among the pupil images respectively incident on the photoelectric converters due to the respective microlenses to partially overlap on the photoelectric converters.

If an assignment number of photoelectric converters that are assigned to each microlens of the array lens is smaller than 3×3, adjacent pupil images of the microlenses begin to overlap (crosstalk is generated). In general, from a photoelectric converter in which the crosstalk is generated, a light field cannot be taken out and pixel signals corresponding to the same viewpoint position are taken out one by one from the pupil image as in JP2013-90059A and JP2013-115532A. In a case in which an image is reconstructed, a correct image cannot be generated.

However, in the case of the present invention, since the pixel signals of the X simultaneously captured images having different characteristics may be acquired, the pupil images corresponding to at least X light reception areas (different light reception areas) may not overlap. That is, even when pupil images adjacent to each other partially overlap on the photoelectric converter, images near the pupil images having the same characteristics only overlap. Although there is a somewhat change in characteristics, the image does not collapse.

Thus, since the array lens causes the pupil images adjacent to each other to partially overlap on the photoelectric converter, the assignment number of photoelectric converters that are substantially assigned to each microlens of the array lens can be smaller than 3×3 and, as a result, it is possible to increase the number of pixels of simultaneously captured images having different characteristics.

In the imaging module according to yet another aspect of the present invention, it is preferable that the multi-lens includes a first optical system at a center, and a second optical system provided in a portion surrounding the first optical system and having different characteristics from the first optical system; when the pupil division device and the Y photoelectric converters are set as a unit block, the unit block includes 3×3 photoelectric converters arranged in a lattice shape; the first optical system of the multi-lens is a circular central optical system, and the second optical system is the annular optical system arranged concentrically with respect to the central optical system; a central pupil image corresponding to the first optical system is incident on the photoelectric converter at a center of the unit block; an annular pupil image corresponding to the second optical system is incident on the eight surrounding photoelectric converters of the unit block; and an image sensor is configured such that 4×4 photoelectric converters arranged in a lattice shape are set as a basic block, and the basic block is repeatedly arranged in a horizontal direction and a vertical direction.

In the imaging module according to yet another aspect of the present invention, it is preferable that the multi-lens includes a first optical system at a center, and a second optical system provided in a portion surrounding the first optical system and having different characteristics from the first optical system; the first optical system of the multi-lens is a circular central optical system, and the second optical system is the annular optical system arranged concentrically with respect to the central optical system; the array lens causes annular pupil images corresponding to the annular optical systems adjacent to each other among the pupil images respectively formed on the Y photoelectric converters by the respective microlenses to overlap on the Y photoelectric converters, and causes the central pupil image corresponding to the central optical system and the annular pupil image corresponding to the second optical system adjacent to each other to partially overlap; and the annular optical system is formed such that a portion corresponding to a portion of the annular pupil image overlapping the central pupil image corresponding to the central optical system is shielded or a portion corresponding to a portion of the annular pupil image overlapping the central pupil image corresponding to the central optical system lacks.

According to yet another aspect of the present invention, the annular optical system is formed so that a portion thereof is shielded or lacks and the central pupil image and the annular pupil image do not overlap on the photoelectric converter. Accordingly, it is possible to further reduce the actual assignment number of photoelectric converters per microlens of the array lens.

In the imaging module according to yet another aspect of the present invention, it is preferable that the multi-lens includes a first optical system at a center, and a second optical system provided in a portion surrounding the first optical system and having different characteristics from the first optical system; the first optical system of the multi-lens is a circular central optical system, and the second optical system is an annular optical system that is concentrically arranged with respect to the central optical system and in which a third optical system and a fourth optical system having different characteristics are alternately arranged; and the array lens causes first annular pupil images corresponding to the third optical systems of the annular optical systems adjacent to each other among the pupil images respectively formed on the Y photoelectric converters by the respective microlenses to overlap on the Y photoelectric converters, and causes second annular pupil images corresponding to the fourth optical systems of the annular optical systems adjacent to each other to overlap on the Y photoelectric converters. Accordingly, it is possible to simultaneously acquire three types of image having different characteristics through onetime imaging.

In the imaging module according to yet another aspect of the present invention, it is preferable that the photoelectric converters are arranged in a hexagonal lattice shape; when the pupil division device and the Y photoelectric converters are set as a unit block, the unit block includes one central photoelectric converter and six surrounding photoelectric converters; and a central pupil image corresponding to the central optical system is incident on the central photoelectric converter, a first annular pupil image corresponding to the third optical system of the annular optical system is incident on the three photoelectric converters in three directions at 120° from the central photoelectric converter among the six surrounding photoelectric converters, and a second annular pupil image corresponding to the fourth optical system of the annular optical system is incident on the three other photoelectric converters in three directions at 120° from the central photoelectric converter among the six surrounding photoelectric converters.

In the imaging module according to yet another aspect of the present invention, it is preferable that the central optical system of the multi-lens is a wide-angle optical system, and the third optical system and the fourth optical system of the annular optical system are telescopic optical systems having different focal lengths. Accordingly, it is possible to simultaneously acquire a wide-angle image and two telescopic images having different imaging magnifications through onetime imaging.

In the imaging module according to yet another aspect of the present invention, it is preferable that the central optical system of the multi-lens is a wide-angle optical system, and the third optical system and the fourth optical system of the annular optical system are telescopic optical systems having different imaging distances. Accordingly, it is possible to simultaneously acquire a wide-angle image and two telescopic images focused on a subject having different imaging distances through onetime imaging.

In the imaging module according to yet another aspect of the present invention, it is preferable for the annular optical system to include a reflective optical system that reflects a light beam twice or more. Accordingly, it is possible to shorten a dimension in an optical axis direction of the annular optical system and to make the device compact.

An imaging device according to yet another aspect of the present invention comprises any one of the imaging modules; and an image generation unit that generates an image signal corresponding to one pixel constituting at least one image composed of information of the plurality of wavelength regions based on pixel signals output from photoelectric converters in one unit block when the pupil division device and the Y photoelectric converters are set as the unit block.

According to another aspect of the present invention, it is possible to generate an image signal subjected to demosaic processing corresponding to one pixel using the pixel signals in the unit block with respect to at least one of X simultaneously captured images, and to achieve improvement of the image quality and the resolution of the image.

According to the present invention, it is possible to achieve improvement of the image quality and the resolution of at least one of the simultaneously captured images having different characteristics. Further, since the array lens causes the pupil images of the multi-lens adjacent to each other to partially overlap on the photoelectric converter, it is possible to reduce the assignment number of photoelectric converters that are substantially assigned to each microlens of the array lens and, as a result, to increase the number of pixels of images having different characteristics that can be simultaneously captured.

BRIEF DESCRIPTION OF THE DRAWINGS

FIG. 5 is a diagram illustrating, for example, a color filter array of the first embodiment of the color filter arranged in the image sensor applied to the imaging device according to the present invention.

FIG. 6 is a diagram illustrating, for example, a color filter array of a second embodiment of the color filter arranged in the image sensor applied to the imaging device according to the present invention.

FIG. 7 is a diagram used to describe a preferred color filter array in the image sensor.

FIG. 8 is another diagram used to describe a preferred color filter array in the image sensor.

FIG. 10 is a diagram used to describe, for example, a color filter array of the image sensor in the second embodiment of the imaging device according to the present invention.

FIG. 11 illustrates a first modification example of the color filter array of the image sensor of the second embodiment.

FIG. 13 illustrates a third modification example of the color filter array of the image sensor of the second embodiment.

FIG. 14 is a diagram illustrating, for example, an imaging optical system, an array lens, and an image sensor used to describe a third embodiment of the imaging device according to the present invention.

FIG. 16 is a diagram illustrating a color filter array of the image sensor in the fourth embodiment.

FIG. 24 is a diagram used to describe a problem to be solved by the invention.

DESCRIPTION OF THE PREFERRED EMBODIMENTS

Hereinafter, embodiments of an imaging module and an imaging device according to the present invention will be described with reference to the accompanying drawings.

<Appearance of Imaging Device>

Figure 1:
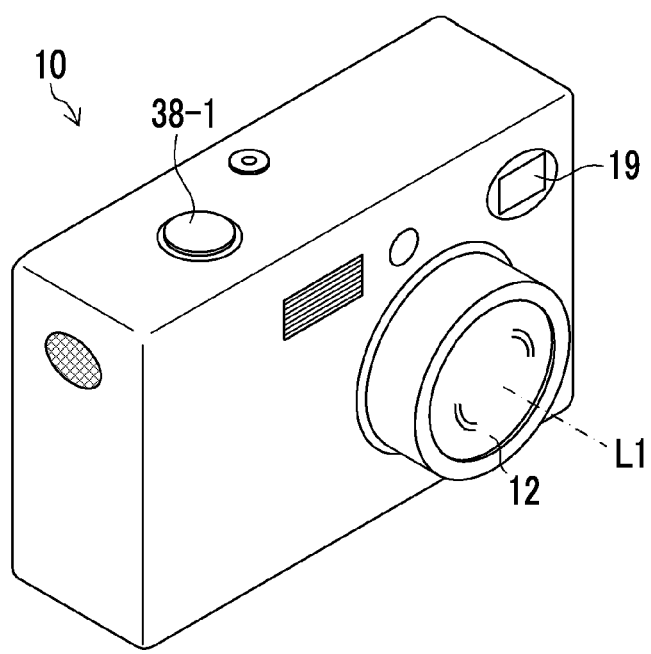
FIG. 1 is a perspective view of an appearance of an imaging device including an imaging module according to the present invention.

FIG. 1 is an external perspective view of an imaging device including an imaging module according to the present invention. As illustrated in FIG. 1, a multi-lens (imaging optical system) 12, a flash light emitting unit 19, and the like are arranged on a front surface of the imaging device 10, and a shutter button 38-1 is provided on a top surface. L1 indicates an optical axis of a multi-lens 12.

Figure 2:
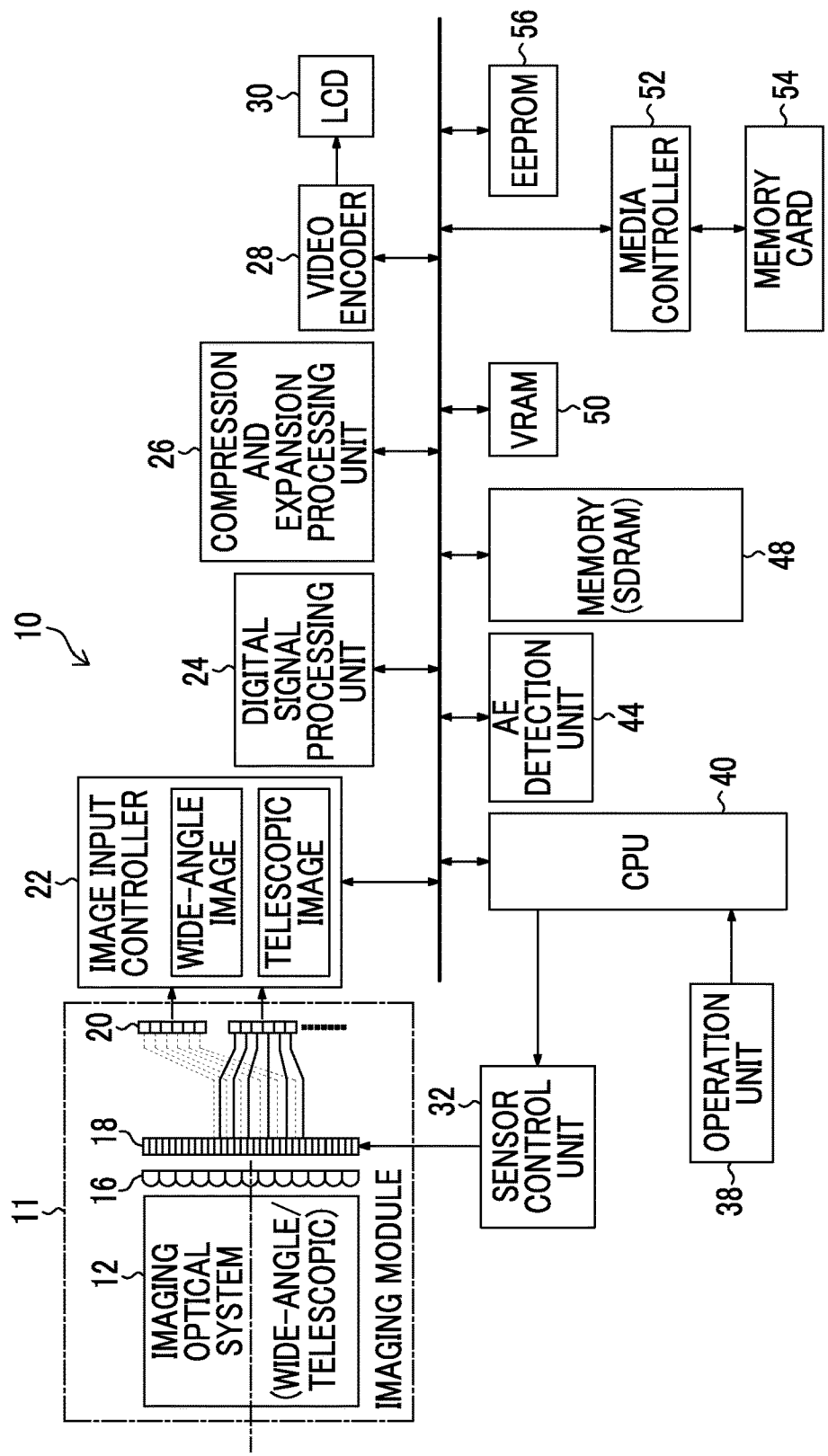
FIG. 2 is a block diagram illustrating an embodiment of an internal configuration of the imaging device illustrated in FIG. 1.

FIG. 2 is a block diagram illustrating an embodiment of an internal configuration of the imaging device 10.

This imaging device 10 records a captured image on a memory card 54, and is mainly characterized by an imaging module 11 including, for example, the multi-lens 12, an array lens 16, and an image sensor 18.

[Imaging Optical System]

Figure 3:
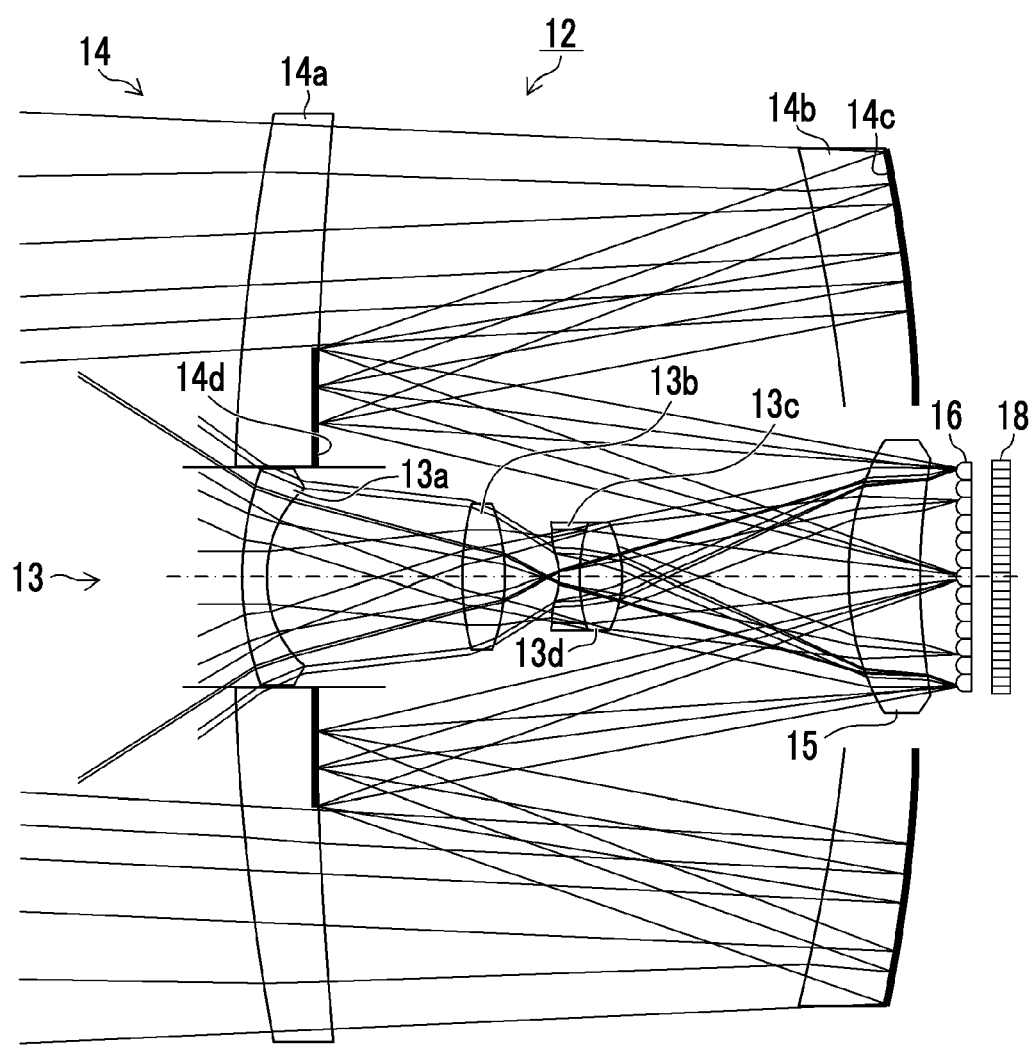
FIG. 3 is a sectional view illustrating a first embodiment of an imaging optical system used in the imaging device illustrated in FIG. 1.

FIG. 3 is a sectional view illustrating a first embodiment of the various lens applied to the imaging device 10 (imaging module 11).

As illustrated in FIG. 3, the multi-lens 12 includes a central optical system (first optical system) 13 in a central portion and an annular optical system (second optical system) 14 in a surrounding portion which are arranged on the same optical axis.

The central optical system 13 is a wide-angle optical system (wide-angle lens) including a first lens 13a, a second lens 13b, a third lens 13c, a fourth lens 13d, and a common lens 15, and forms a wide-angle image on the array lens 16.

The annular optical system 14 is a telescopic optical system (telescopic lens) including a first lens 14a, a second lens 14b, a first reflective mirror 14c (reflective optical system), a second reflective mirror 14d (reflective optical system), and a common lens 15, and forms a telescopic image on the array lens 16. A light beam incident through the first lens 14a and the second lens 14b is reflected twice by the first reflective mirror 14c and the second reflective mirror 14d, and passes through the common lens 15. By the light beam being folded back by the first reflective mirror 14c and the second reflective mirror 14d, a length in an optical axis direction of the telescopic optical system (telescopic lens) having a great focal length is shortened.

First Embodiment of Imaging Device According to the Present Invention

Next, a first embodiment of an imaging device according to the present invention will be described.

Figure 4:
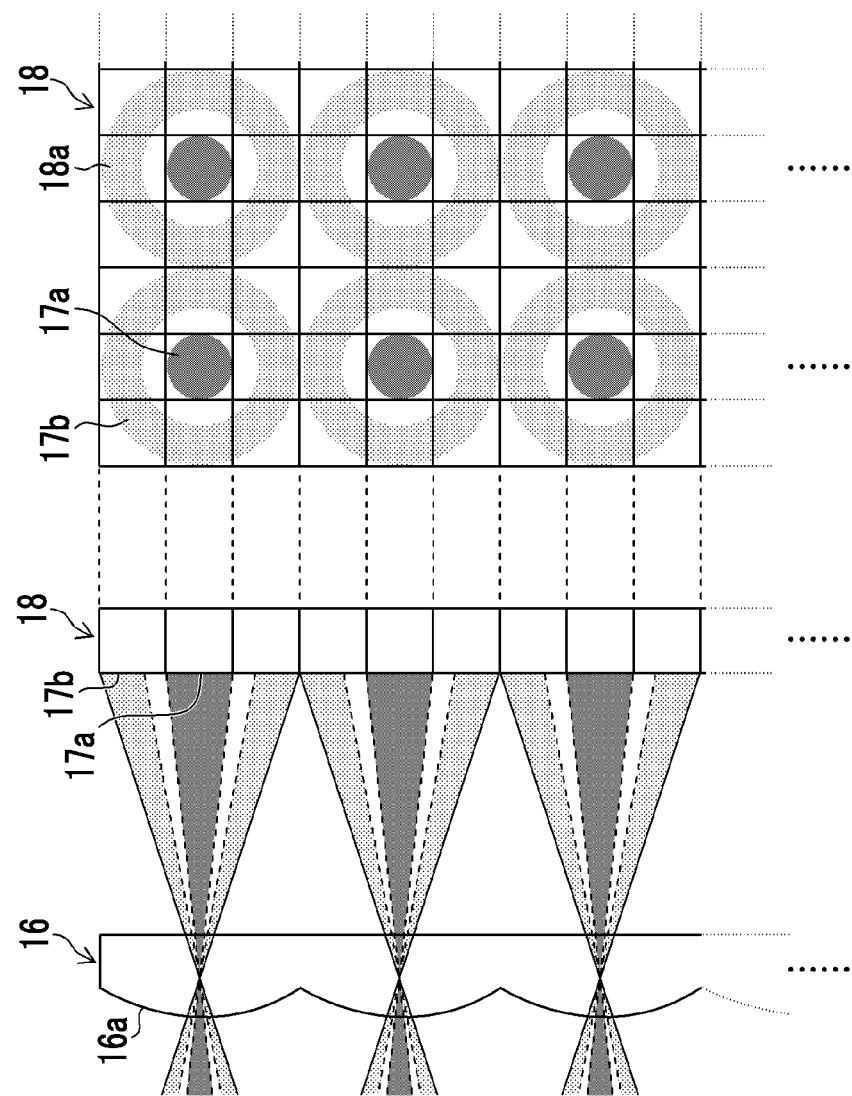
FIG. 4 is an enlarged diagram of primary portions of an array lens and an image sensor used to describe a first embodiment of the imaging device according to the present invention.

FIG. 4 is an enlarged diagram of primary portions of the array lens 16 and the image sensor 18 illustrated in FIGS. 2 and 3.

The array lens 16 is configured by arranging a plurality of microlenses (pupil imaging lenses) 16a in a two-dimensional form, and intervals in horizontal and vertical directions between the respective microlenses correspond to an interval of three light reception cells (photoelectric converters) 18a of the image sensor 18. That is, each microlens of the array lens 16 formed to correspond to the position of every two other light reception cell in each of the horizontal and vertical directions is used.

Further, each microlens 16a of the array lens 16 forms a circular central pupil image (first pupil image) 17a and an annular pupil image (second the pupil image) 17b corresponding to the central optical system 13 and the annular optical system 14 of the multi-lens 12 on the light reception cell 18a of the corresponding light reception area of the image sensor 18.

According to the array lens 16 and the image sensor 18 of the first embodiment illustrated in FIG. 4, 3×3 light reception cells 18a in a lattice shape (square lattice shape) are assigned to each microlens 16a of the array lens 16. Hereinafter, one microlens 16a and a light reception cell group (3×3 light reception cells 18a) corresponding to one microlens 16a are referred to as a unit block.

The central pupil image 17a is formed on only the light reception cells 18a at a center in the unit block, and the annular pupil image 17b is formed on the eight surrounding light reception cells 18a in the unit block.

According to the imaging device 10 (imaging module 11) of the present invention, it is possible to simultaneously capture a wide-angle image corresponding to the central optical system 13 and a telescopic image corresponding to the annular optical system 14 as described below.

First Embodiment of Image Sensor

FIG. 5 is a diagram illustrating the image sensor 18 applied to the imaging device 10 (imaging module 11) according to the present invention, and is, particularly, a diagram illustrating a color filter array or the like of a first embodiment of the color filters arranged in the image sensor 18. In FIG. 5, although the array lens 16 is omitted, an area indicated by a circle indicates a unit block including 3×3 light reception cells on which a pupil image is formed by each microlens 16a of the array lens 16.

A color filter array including a color filter arranged on each light reception cell is provided on an imaging surface of the image sensor 18, as illustrated in portion (a) of FIG. 5.

This color filter array includes three primary color filters (hereinafter referred to as a R filter, a G filter, and a B filter) that transmit light in respective wavelength regions of red (R), green (G), and blue (B). Any one of the RGB filters is arranged on each light reception cell. Hereinafter, the light reception cell on which the R filter is arranged is referred to as an "R light reception cell", the light reception cell on which the G filter is arranged is referred to as an "G light reception cell", and the light reception cell on which the B filter is arranged is referred to as a "B light reception cell."

The color filter array illustrated in portion (a) of FIG. 5 has a configuration in which 6×6 light reception cells are set as a basic block B (see a block indicated by a bold frame in portion (a) of FIG. 5, and portion (b) of FIG. 5), and the basic blocks B are repeatedly arranged in a horizontal direction and a vertical direction.

As illustrated in portion (b) of FIG. 5, the basic block B includes four unit blocks B1 to B4.

Portions (c1) and (c2) of FIG. 5 illustrate a group of light reception cells at the centers of four unit blocks B1 to B4 (light reception cells on which a light beam passing through the central optical system 13 illustrated in FIG. 3 is incident), and a group of eight surrounding light reception cells (light reception cells on which a light beam passing through the annular optical system 14 illustrated in FIG. 3 is incident), respectively.

As illustrated in portion (c1) of FIG. 5, an image of the group of light reception cells at the centers becomes a mosaic image of the Bayer array. Accordingly, it is possible to obtain a color image without problems by performing demosaic processing on the mosaic image of the Bayer array.

Meanwhile, as illustrated in portion (c2) of FIG. 5, the group of eight light reception cells around the light reception cell at the center of each of the unit blocks B1 to B4 includes the light reception cells (the R light reception cell, the G light reception cell, and the B light reception cell) of all of RGB in the eight light reception cells, and the RGB light reception cells are arranged in the same pattern regardless of the unit blocks B1 to B4.

Specifically, four light reception cells at four corners of each of the unit blocks B1 to B4 are arranged as G light reception cells, two light reception cells on the upper and lower sides between which the light reception cell at the center is interposed are arranged as R light reception cells, and two light reception cells on the left and right sides between which the light reception cell at the center is interposed are arranged which are B light reception cells.

Further, the R light reception cells, the G light reception cells, and the B light reception cells are arranged in symmetrical positions with respect to the light reception cell (center) at the center in each unit block. Accordingly, one pixel (RGB pixel value) constituting an image after the demosaic processing (synchronization process) for each unit block can be generated using output signals of the light reception cells of RGB in the unit block.

That is, it is possible to acquire a pixel value of the G pixel in the center position of the unit block (one microlens) by obtaining an average value of the output signals (pixel values) of the four G light reception cells in the unit block, and it is possible to similarly acquire pixel values of the R pixel and the B pixel in the center positions of the unit block by obtaining an average value of the pixel values of the two R light reception cells in the unit block and an average value of the pixel values of the two B light reception cells.

Accordingly, the demosaic processing can be performed on the telescopic image corresponding to the annular optical system 14 (telescopic optical system) generated by the group of eight surrounding light reception cells in the unit block using the pixel values of the light reception cells of RGB in the unit block, it is not necessary to generate the pixel values of the pixels of a specific wavelength region by interpolating pixel values of the light reception cells in the surrounding unit block, and the resolution (the actual number of pixels) of the output image is not degraded.

Further, the eight surrounding light reception cells in the unit blocks B1 to B4 include two R light reception cells, four G light reception cells, and two B light reception cells, a ratio of the light reception cells of RGB becomes 1:2:1, and a number of G light reception cells contributing most to obtaining the luminance signal are arranged.

Referring back to FIG. 2, the imaging device 10 (imaging module 11) includes the multi-lens 12 having the central optical system 13 and the annular optical system 14 described with reference to FIG. 3, and the array lens 16 and the image sensor 18 of the first embodiment described with reference to FIGS. 4 and 5. An entire operation of the device is generally controlled by a central processing unit (CPU) 40 based on a camera control program stored in an electrically erasable programmable read-only memory (EEPROM) 56. Defect information of the pixels of the image sensor 18, various parameters or tables used for, for example, image processing, and the like are stored in the EEPROM 56, in addition to the camera control program.

In the imaging device 10, an operation unit 38 such as the shutter button 38-1, a mode dial (mode switching device), a playback button, a MENU/OK key, a cross key, and a BACK key is provided. A signal from the operation unit 38 is input to the CPU 40, and the CPU 40 controls each circuit of the imaging device 10 based on the input signal and performs, for example, imaging operation control, image processing control, image data recording/reproducing control, or display control of a liquid crystal monitor (LCD) 30.

The shutter button 38-1 (FIG. 1) is an operation button that inputs an instruction to start imaging, and includes a two-step stroke switch including an S1 switch that is turned ON at the time of half pressing and an S2 switch that is turned ON at the time of full pressing.

The mode dial is selection means for switching to an auto imaging mode in which a still image is captured, a manual imaging mode, a scene position such as a portrait, a landscape, and a night scene, and a video mode in which a video is captured. Further, the mode dial functions as selection means for switching, at the time of the imaging mode, a first imaging mode in which a wide-angle image (first image) formed through the central optical system 13 is acquired, a second imaging mode in which a telescopic image (second image) formed through the annular optical system 14 is acquired, a hybrid imaging mode in which the wide-angle image and the telescopic image are simultaneously acquired, and the like.

The playback button is a button for switching to a playback mode in which a captured and recorded still image or video is displayed on the liquid crystal monitor 30. The MENU/OK key is an operation key having both of a function of a menu button for performing an instruction to display a menu on a screen of the liquid crystal monitor 30, and a function of an OK button to instruct, for example, confirmation and execution of selected content. The cross key is an operation unit that inputs an indication of four directions including up, down, left and right, and functions as a button (cursor movement operation means) for selecting an item from the menu or instructing selection of various setting items of each menu. Further, an up/down key of the cross key functions as a zoom switch at the time of imaging or a playback zoom switch at the time of the playback mode, and a left/right key functions as a frame-by-frame feeding (forward/reverse feeding) button at the time of the playback mode. The BACK key is used, for example, to erase a desired target such as a selected item, cancel instruction content, or return to a directly previous operation state.

In the imaging mode, subject light is formed as an image on a light reception surface of the image sensor 18 via the multi-lens 12 and the array lens 16.

A subject image formed on the light reception surface of each light reception cell (photoelectric converter) of the image sensor 18 is converted to a signal voltage (or charge) having magnitude corresponding to an amount of incident light.

The signal voltage (or charge) accumulated in the image sensor 18 is accumulated in the light reception cell itself or a provided capacitor. The accumulated signal voltage (or charge) is read together with selection of a light reception cell position using a scheme of a MOS imaging element (a so-called CMOS sensor), which uses an X-Y address scheme, by a sensor control unit 32.

Accordingly, a pixel signal representing the wide-angle image of a group of the light reception cells at centers corresponding to the central optical system 13, and a pixel signal representing the telescopic image of group of the eight surrounding light reception cells corresponding to the annular optical system 14 can be read from the image sensor 18.

The pixel signal (voltage signal) read from the image sensor 18 is sampled and held for each light reception cell through a correlated double sampling process (a process of obtaining accurate pixel data by calculating a difference between a feed-through component level and a signal component level included in an output signal of each light reception cell for the purpose of reducing noise (particularly, thermal noise) or the like included in the sensor output signal), amplified, and then applied to the A/D converter 20. The A/D converter 20 converts sequentially input pixel signals to a digital signal and outputs the digital signal to an image input controller 22. Further, an A/D converter may be built into a MOS type sensor. In this case, the digital signal is directly output from the image sensor 18.

By selecting the light reception cell position of the image sensor 18 and reading the pixel signal, it is possible to selectively read the pixel signal representing the wide-angle image and the pixel signal representing the telescopic image.

That is, the pixel signal representing the wide-angle image (pixel signal representing a mosaic image of a Bayer array) of one light reception cell (light reception cell at a center among the 3×3 light reception cells) per microlens can be acquired by selectively reading the pixel signal of the light reception cell of the image sensor 18 on which the central pupil image 17a is incident, whereas eight pixel signals per microlens can be acquired by selectively reading the pixel signals of the eight light reception cells of the image sensor 18 on which the annular pupil image 17b is incident.

All the pixel signals may be read from the image sensor 18 and temporarily stored in a memory (SDRAM) 48, and a digital signal processing unit (image generation unit) 24 may perform grouping of pixel signals of two images including the wide-angle image and the telescopic image similarly to the above based on the pixel signals stored in the memory 48.

Further, the digital signal processing unit 24 performs predetermined signal processing such as offset processing or a gamma correction process on a digital image signal (point-sequential R, G, and B signals of RGB) input via the image input controller 22, and demosaic processing on a signal of a demosaic image of R G B. Here, the demosaic processing is a process of calculating all color information for each pixel from the RGB mosaic image corresponding to a color filter array of a single-plate image sensor 18 and is also referred to as a synchronization process. For example, in the case of the image sensor 18 including filters for three colors including RGB, the demosaic processing is a process of calculating color information of all of R, G, and B for each pixel from the mosaic image including R, G, and B.

That is, a demosaic processing unit included in the digital signal processing unit 24 interpolates an R signal and a B signal of an R light reception cell and a B light reception cell around the G light reception cell to generate an R signal and a B signal in a position of the G light reception cell since an R light reception cell and a B light reception cell are not present in the position of the G light reception cell of the wide-angle image (a mosaic image of the Bayer array). Similarly, the demosaic processing unit interpolates an G signal and a B signal of an G light reception cell and a B light reception cell around the R light reception cell to generate a G signal and a B signal in a position of the R light reception cell since an G light reception cell and a B light reception cell are not present in the position of the R light reception cell of the mosaic image, and interpolates an G signal and a R signal of an G light reception cell and a R light reception cell around the B light reception cell to generate a G signal and a R signal in a position of the B light reception cell since an G light reception cell and a R light reception cell are not present in the position of the B light reception cell of the mosaic image.

Meanwhile, since the telescopic image is formed of eight mosaic images (mosaic images of eight surrounding light reception cells of the 3×3 unit block) per microlens 16a, and color information (the R light reception cell, the G light reception cell, and the B light reception cell) of all of RGB are included within the eight light reception cells, the demosaic processing unit can generate one pixel (RGB pixel values) constituting the image subjected to demosaic processing for each unit block using the output signal of the eight light reception cells in the unit block.

Specifically, the demosaic processing unit (image generation unit) that performs demosaic processing on the mosaic image of the telescopic image calculates a G pixel value of the pixel in a center position of the unit block (1 microlens) by obtaining an average value of pixel values of four G light reception cells in the unit block, and similarly, calculates a R pixel value and a B pixel value of the pixel in the center position of the unit block by obtaining an average value of pixel values of two R light reception cells and an average value of pixel values of the two B light reception cells in the unit block.

Since the demosaic image of the telescopic image among the two demosaic images including the wide-angle image and the telescopic image generated by the demosaic processing unit is subjected to the demosaic processing using the output signals of the eight light reception cells in the unit block, the resolution is substantially higher than that of the demosaic image of the wide-angle image subjected to demosaic processing using (interpolating) the output signals of the light reception cells of the surrounding unit blocks.

Further, the digital signal processing unit 24 performs, for example, RGB/YC conversion to generate a luminance signal Y and color difference signals Cb and Cr from the RGB color information (R signal, G signal, and B signal) on which the demosaic processing is performed by the demosaic processing unit.

The image signal processed by the digital signal processing unit 24 is input to a video random access memory (VRAM) 50. The image signal read from the VRAM 50 is encoded by a video encoder 28 and output to the liquid crystal monitor 30 provided on a back surface of the camera. Accordingly, the subject image is displayed on the display screen of the liquid crystal monitor 30.

When there is pressing (half pressing) of a first step of the shutter button 38-1 of the operation unit 38, the CPU 40 starts an AE operation, and the image data output from the A/D converter 20 is input to an AE detection unit 44.

The AE detection unit 44 integrates the image signal of the entire screen or integrates an image signal differently weighted in a screen center portion and a surrounding portion, and outputs an integrated value to the CPU 40. The CPU 40 calculates brightness (imaging Ev value) of the subject from the integrated value input from the AE detection unit 44, determines an diaphragm value of an diaphragm (not illustrated) and an electronic shutter (shutter speed) of the image sensor 18 according to a predetermined program diagram based on the imaging Ev value, controls the diaphragm based on the determined diaphragm value, and controls a charge accumulation time of the image sensor 18 via the sensor control unit 32 based on the determined shutter speed.

When the AE operation ends and there is pressing (full pressing) of a second step of the shutter button 38-1, the image data output from the A/D converter 20 is input from the image input controller 22 to the memory (SDRAM: Synchronous Dynamic RAM) 48 in response to the pressing, and is temporarily stored in the memory 48. The image signal temporarily stored in the memory 48 is appropriately read by the digital signal processing unit 24, performed on predetermined signal processing by the digital signal processing unit 24, and stored in the memory 48 again.

The image signal stored in the memory 48 is output to a compression and expansion processing unit 26, subjected to a predetermined compression process such as Joint Photographic Experts Group (JPEG), and then, recorded in the memory card 54 via a media controller 52.

When the first imaging mode or the second imaging mode is selected by the mode dial, the wide-angle image or the telescopic image can be selectively acquired. When the hybrid imaging mode is selected by the mode dial, the wide-angle image and the telescopic image can be simultaneously acquired. Accordingly, it is possible to acquire the wide-angle image and the telescopic image without mechanical switching of the wide-angle optical system and the telescopic optical system or without a zooming operation of a zoom lens.

Second Embodiment of Image Sensor

FIG. 6 is a diagram illustrating another embodiment of the image sensor 18 which is applied to the imaging device 10 (imaging module 11) according to the present invention, and is, particularly, a diagram illustrating a color filter array or the like of a second embodiment of the color filter arranged in the image sensor 18.

As illustrated in portion (a) of FIG. 6, a color filter array of another embodiment of the image sensor 18 has a configuration in which 6×6 light reception cells are set as a basic block B (see a block indicated by a sold frame in portion (a) of FIG. 6, and portion (b) of FIG. 6), and the basic blocks B are repeatedly arranged in a horizontal direction and a vertical direction, similar to the color filter array illustrated in portion (a) of FIG. 5.

The basic block B includes four unit blocks B1 to B4, as illustrated in portion (b) of FIG. 6.

Portions (c1) and (c2) of FIG. 6 illustrate a group of light reception cells at the centers of four unit blocks B1 to B4, and a group of eight surrounding light reception cells, respectively.

As illustrated in portion (c1) of FIG. 6, an image of the group of light reception cells at the centers becomes a mosaic image of the Bayer array. Accordingly, it is possible to obtain a color image without problems by performing demosaic processing on the mosaic image of the Bayer array.

Meanwhile, as illustrated in portion (c2) of FIG. 6, the group of eight light reception cells around the light reception cell at the center of each of the unit blocks B1 to B4 includes the light reception cells (the R light reception cell, the G light reception cell, and the B light reception cell) of all of RGB in the eight light reception cells, and the RGB light reception cells are arranged in the same pattern regardless of the unit blocks B1 to B4.

Specifically, four light reception cells on upper, lower, left, and right sides between which the light reception cell at the center of each of the unit blocks B1 to B4 is interposed are arranged as G light reception cells, two light reception cells on the upper left and lower right sides of the unit block are arranged as R light reception cells, and two light reception cells on the upper right and lower left sides of the unit block are arranged as B light reception cells.

Further, the R light reception cells, the G light reception cells, and the B light reception cells are arranged in symmetrical positions with respect to the light reception cell (center) at the center in each unit block. Accordingly, one pixel (RGB pixel value) constituting an image after the demosaic processing for each unit block can be generated using output signals of the light reception cells of RGB in the unit block.

That is, it is possible to acquire a pixel value of the G light reception cell in the center position of the unit block (one microlens) by obtaining an average value of the pixel values of the four G light reception cells in the unit block, and it is possible to similarly acquire pixel values of the R pixel and the B pixel in the center positions of the unit block by obtaining an average value of the pixel values of the two R light reception cells in the unit block and an average value of the pixel values of the two B light reception cells.

Further, the eight surrounding light reception cells in the unit blocks B1 to B4 include two R light reception cells, four G light reception cells, and two B light reception cells, a ratio of the light reception cells of RGB becomes 1:2:1, and a number of G light reception cells contributing most to obtaining the luminance signal are arranged.

In the above embodiment, the color filters are periodically arranged in a certain pattern in the light reception cells at the respective centers so that the image of the group of light reception cells at the centers in the unit blocks B1 to B4 is a mosaic image of the Bayer array, but the present invention is not limited thereto, and the color filter arranged on the light reception cell at each center may be arranged as a color filter of a G stripe RlG full checkered or X-Trans (registered trademark) array or the like. In short, the color filters may be arranged so that the pixel signals in the entire wavelength region can be obtained.

[More Preferred Filter Array of Eight Surrounding Pixels (1)]

As the color filter array for eight surrounding light reception cells in the unit block having 3×3 light reception cells, various arrays other than those in the first and second embodiments illustrated in FIGS. 5 and 6 may be considered.

Portion (a) and portion (b) of FIG. 7 illustrate the first embodiment of the color filter illustrated in portion (a) of FIG. 5, and illustrate, particularly, an incidence area in the eight surrounding light reception cells in the 3×3 unit block on which a light beam passing through the annular optical system 14 in the multi-lens 12 is incident due to the directivity of the microlens 16a.

As illustrated in portion (a) of FIG. 7, at an image center (unit block near the optical axis of the image sensor 18), since the incidence area of the light beam transmitted through the annular optical system 14 becomes a clean circular annular shape, a difference is not generated between the RGB filter array in eight surrounding light reception cells.

Meanwhile, occurrence of "eclipse" near the image away from the optical axis is known as a general property of the optical lens. In the case of an optical lens having a circular ring pupil as in the annular optical system 14 of the present embodiment, a pattern of light incident on a sensor surface is changed from a circle to a crescent shape due to the "eclipse" (portions (b) to (e) of FIG. 7).

That is, in the periphery of the image sensor 18, light tends to be able to be detected only in deflected light reception cells among the eight surrounding light reception cells in the unit block. In this case, in order to acquire information of all colors, it is preferable for the light reception cells of RGB that output pixel signals in respective wavelength regions to be evenly assigned to the eight light reception cells.

In the case of the color filter array (the first embodiment) illustrated in portion (b) of FIG. 7, in the unit blocks around four corners of the image sensor 18, a crescent-shaped light beam is evenly incident on the eight surrounding light reception cells of RGB, and an area ratio of the respective light reception cells of RGB on which the crescent-shaped light beam is incident is substantially equal (G≈R=B).

Further, in the case of the color filter array illustrated in portion (c) of FIG. 7 (the second embodiment illustrated in portion (a) of FIG. 6), the crescent-shaped light beam is evenly incident on the eight surrounding RGB light reception cells, and the area ratio of the respective light reception cells of RGB on which the crescent-shaped light beam is incident is substantially equal (G≈R≈B).

Meanwhile, in the case of the color filter array illustrated in portion (d) of FIG. 7, the eight surrounding light reception cells of RGB are not evenly arranged with respect to the surrounding directions, and the area ratio of the respective light reception cells of RGB on which the crescent-shaped light beam is incident is not uniform (G>>R>B). Similarly, in the case of the color filter array illustrated in portion (e) of FIG. 7, the eight surrounding light reception cells of RGB are not evenly arranged with respect to the surrounding directions, and the area ratio of the respective light reception cells of RGB on which the crescent-shaped light beam is incident is not uniform (G>R=B).

As described above, in the filter array of the eight surrounding light reception cells in the unit block having 3×3 light reception cells, it is more preferable for the light reception cells of RGB to be arranged evenly with respect to the surrounding directions (so that a center of gravity comes to the center of the unit block), as in the first and second embodiments illustrated in portion (a) of FIG. 5 and portion (b) of FIG. 6.

[More Preferred Filter Array of Eight Surrounding Pixels (2)]

Next, a more preferred filter array of the eight surrounding light reception cells will be described from the viewpoint of a reduction in a process of manufacturing color filters and crosstalk.

Portion (a) and portion (b) of FIG. 8 illustrate the color filter arrays of the first and second embodiments illustrated in portion (a) of FIG. 5 and portion (b) of FIG. 6, respectively.

As illustrated in portion (a) of FIG. 8, when unit blocks each having 3×3 light reception cells are arranged, it is more preferable for the unit blocks to be arranged so that wavelength filters (color filters) of pixels in contact with adjacent unit blocks are the same type.

Reasons therefor are as follows.

(1) If the wavelength filters are the same type, filter units can be connected. Accordingly, a manufacturing process of forming the wavelength filter is simplified.

(2) If the wavelength filters are the same type (same color), even in a case in which there is crosstalk of a signal from the adjacent unit block, only spatial resolution is degraded. In a case in which a crosstalk signal is a component of a different color, an error of a color signal is generated and image quality is degraded, in addition to the reduction in the spatial resolution.

Therefore, it is more preferable for the wavelength filters of the pixels in contact with the adjacent unit blocks to be arranged to be the same type.

In the case of the color filter array of the first embodiment illustrated in portion (a) of FIG. 8, when the unit blocks each having 3×3 light reception cells are arranged, four G light reception cells of 2×2 among the eight surrounding light reception cells are adjacent, two R light reception cells among the eight surrounding light reception cells are adjacent in the vertical direction, and two B light reception cells are adjacent in the horizontal direction.

On the other hand, in the case of the color filter array of the second embodiment illustrated in portion (b) of FIG. 8, when the unit blocks each having 3×3 light reception cells are arranged, two G light reception cells among the eight surrounding light reception cells are adjacent, but the R light reception cells and the B light reception cells among the eight surrounding light reception cells are different from adjacent light reception cells in all directions in the wavelength filter.

Therefore, the color filter array of the first embodiment among the color filter arrays of the first and second embodiments illustrated in portion (a) and portion (b) of FIG. 8 can be to be more preferred color filter array since the process of manufacturing color filters is simplified and the crosstalk can be reduced.

<High Density of Pixels>

Next, an embodiment in which the allocation number of light reception cells allocated to each microlens of the array lens is greatly reduced, the number of pixels of a plurality of simultaneously captured images having different characteristics is increased, and high density of pixels is achieved without changing the number of light reception cells of the image sensor will be described.

Second Embodiment of Imaging Device According to the Present Invention

Figure 9:
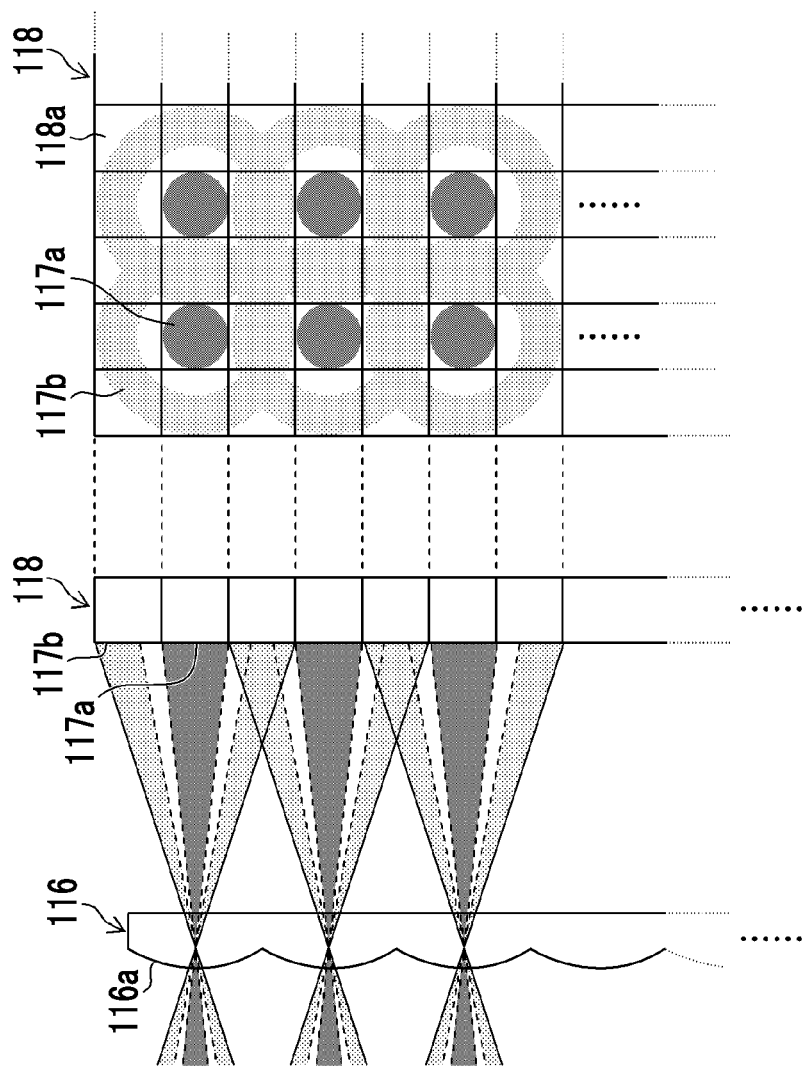
FIG. 9 is an enlarged diagram of primary portions of an array lens and an image sensor used to describe the second embodiment of the imaging device according to the present invention.

FIG. 9 is an enlarged diagram of primary portions of the array lens 116 and the image sensor 118 used to describe the second embodiment of the imaging device (imaging module) according to the present invention. Since the imaging device of the second embodiment is different in the array lens 116 and the image sensor 118 from the imaging device 10 of the first embodiment illustrated in FIGS. 1 to 3, the difference will be described hereinafter.

In FIG. 9, the array lens 116 has a configuration in which a plurality of microlenses 116a are two-dimensionally arranged, and an interval in a horizontal direction and a vertical direction between the respective microlenses corresponds to an interval corresponding to two light reception cells 118a of the image sensor 118. That is, each microlens of the array lens 116 formed corresponding to a position of every other light reception cell in each of the horizontal direction and the vertical direction is used.

Further, each microlens 116a of the array lens 116 forms a circular central pupil image 117a and an annular pupil image 117b corresponding to the central optical system 13 and the annular optical system 14 of the multi-lens 12 on the image sensor 118.

Here, the annular pupil images 117b adjacent to each other partially overlap on the image sensor 118. That is, the array lens 116 is arranged at an appropriate position on the incidence side of the image sensor 118, and is configured such that the annular pupil images 117b adjacent to each other among the central pupil image 117a and the annular pupil image 117b formed on the image sensor 118 by the respective microlenses 116a partially overlap on the image sensor 118.

According to the array lens 116 and the image sensor 118 of the second embodiment illustrated in FIG. 9, the central pupil image 117a is formed on only one (a light reception cell at a center among 3×3 light reception cells) of the light reception cells 118a on the image sensor 118, and the annular pupil image 117b is formed on the eight light reception cells 118a around the light reception cell 118a on which the central pupil image 117a is formed. The annular pupil image 117b formed on the eight light reception cells 118a overlaps the annular pupil images 117b adjacent in a horizontal direction and a vertical direction (up, down, left, and right directions) in a range of one light reception cell.

Since the imaging device of the present invention may be able to capture a wide-angle image corresponding to the central optical system 13 and a telescopic image corresponding to the annular optical system 14, the central pupil image 117a and the annular pupil image 117b may not overlap each other. That is, even when the annular pupil images 117b adjacent to each other partially overlap each other on the image sensor 118, the images do not collapse.

Portion (a) and portion (b) of FIG. 10 are diagrams illustrating, for example, a color filter array arranged in the image sensor 118.

As illustrated in portion (a) of FIG. 10, the color filter array arranged in the image sensor 118 has a configuration in which 4×4 light reception cells are set as a basic block B (a block indicated by a bold frame in portion (a) of FIG. 10), and the basic blocks B are repeatedly arranged in horizontal and vertical directions.

Further, as illustrated in portion (b) of FIG. 10, the image sensor 118 includes unit blocks (four types of unit blocks B1 to B4) in which 3×3 light reception cells are assigned to each microlens 16a, and the adjacent unit blocks overlap in a range of one light reception cell.

Four unit blocks B1 to B4 illustrated in portion (b) of FIG. 10 have the same color filter array as that of the four unit blocks B1 to B4 illustrated in portion (b) of FIG. 5, and an image of a group of the light reception cells at the centers of the unit blocks B1 to B4 is a mosaic image of the Bayer array.

Further, four light reception cells at four corners of each of the unit blocks B1 to B4 among eight light reception cells around the light reception cell at the center of each of the unit blocks B1 to B4 are arranged as G light reception cells, two light reception cells on the upper and lower sides between which the light reception cell at the center is interposed are arranged as R light reception cells, and two light reception cells on the left and right sides between which the light reception cell at the center is interposed are arranged as B light reception cells. The light reception cells of RGB of the eight surrounding light reception cells are evenly arranged in surrounding directions.

As described above, according to the second embodiment of the imaging device of the present invention, if the number of light reception cells of the image sensor 118 is M and the number of pixels of the wide-angle image and the telescopic image obtained from the image sensor is N, a ratio of the number of light reception cells M and the number of pixels N becomes M:N=4:1, and can be greater than the ratio (M:N=9:1) in the case of the first embodiment. That is, it is possible to achieve a high density of the pixels of the wide-angle image and the telescopic image and to improve resolution.

First Modification Example of Second Embodiment of Imaging Device According to the Present Invention Portion (a) and portion (b) of FIG. 11 are diagrams illustrating a first modification example of the second embodiment and, particularly, the first modification example of the second embodiment is different in the color filter array of the image sensor from the second embodiment.

An image sensor 218 illustrated in portion (a) of FIG. 11 has a configuration in which 4×4 light reception cells are set as a basic block B (a block indicated by a bold frame in portion (a) of FIG. 11), and the basic blocks B are repeatedly arranged in horizontal and vertical directions.

In the first modification example of the second embodiment, two sets of 2×2 G light reception cells are present in the basic block B as illustrated in portion (a) of FIG. 11, a process of manufacturing the color filters of G is simplified, and crosstalk can be reduced.

Further, as illustrated in portion (b) of FIG. 11, the image sensor 218 includes unit blocks (four types of unit blocks B1 to B4) in which 3×3 light reception cells are assigned to each microlens 16a, and the adjacent unit blocks overlap in a range of one light reception cell.

As illustrated in portion (b) of FIG. 11, eight surrounding light reception cells of each of the four unit blocks B1 to B4 include two R light reception cells, four G light reception cells, and two B light reception cells. Further, the unit blocks B1 and B4 in which a center is the G light reception cell are two patterns in which arrangements of the R light reception cells and the B light reception cells are different.

Figure 12:
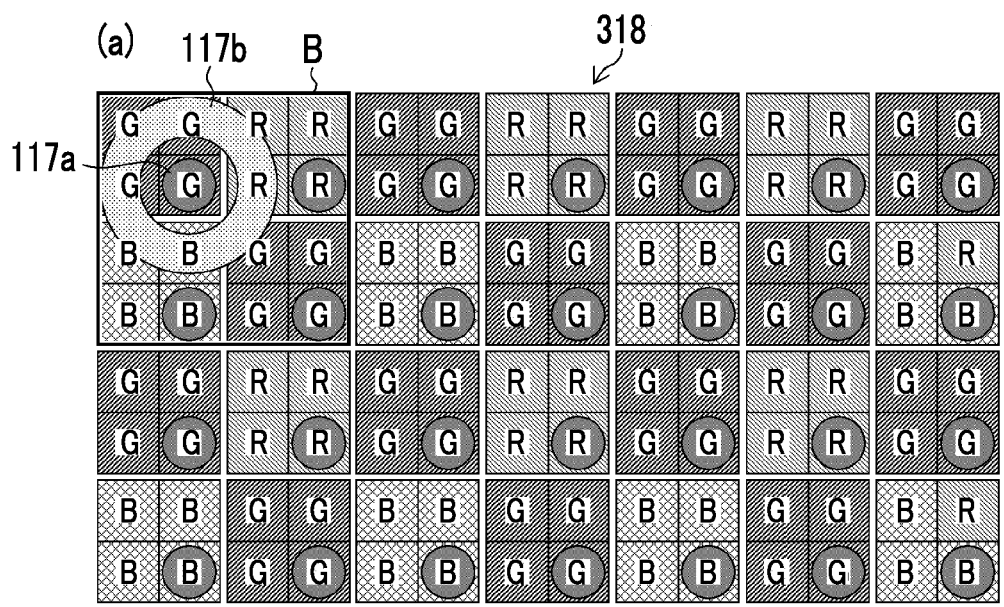
FIG. 12 illustrates a second modification example of the color filter array of the image sensor of the second embodiment.

Second Modification Example of Second Embodiment of Imaging Device According to the Present Invention Portion (a) and portion (b) of FIG. 12 are diagrams illustrating a second modification example of the second embodiment, and particularly, the second modification example of the second embodiment is different in the color filter array of the image sensor from the above-described embodiment.

In the image sensor 318 illustrated in portion (a) of FIG. 12, 4×4 light reception cells are set as a basic block B (a block indicated by a bold frame in portion (a) of FIG. 12), and the basic blocks B are repeatedly arranged in a horizontal direction and a vertical direction.

In the second modification example of the second embodiment, one set of 2×2 R light reception cells, two sets of 2×2 G light reception cells, and one set of 2×2 B light reception cells are present in the basic block B, as illustrated in portion (a) of FIG. 12, and a process of manufacturing the color filters of RGB is most simplified, and crosstalk can be most reduced.

Further, as illustrated in portion (b) of FIG. 12, the image sensor 318 includes unit blocks (four types of unit blocks B1 to B4) in which 3×3 light reception cells are assigned to each microlens 16a, and the adjacent unit blocks overlap in a range of one light reception cell.

As illustrated in portion (b) of FIG. 12, the eight surrounding light reception cells of the unit blocks B1 and B4 of which the center is the G light reception cell among the four unit blocks B1 to B4 include two R light reception cells, four G light reception cells, and two B light reception cells, the eight surrounding light reception cells of the unit block B2 of which the center is the R light reception cell include three R light reception cells, four G light reception cells, and one B light reception cell, and the eight surrounding light reception cells of the unit block B3 of which the center is the B light reception cell include one R light reception cell, four G light reception cells, and three B light reception cells, and a color balance of the RGB light reception cells is lower than that in the first modification example of the second embodiment.

Third Modification Example of Second Embodiment of Imaging Device According to the Present Invention Portion (a) and portion (b) of FIG. 13 are diagrams illustrating a third modification example of the second embodiment, and particularly, the third modification example of the second embodiment is different in the color filter array of the image sensor from the above-described embodiment.

In the image sensor 418 illustrated in portion (a) of FIG. 13, 4×4 light reception cells in a square lattice shape are set as a basic block B (a block indicated by a bold frame in portion (a) of FIG. 13), and the basic blocks B are repeatedly arranged in a horizontal direction and a vertical direction.

In the third modification example of the second embodiment, one set of 2×2 G light reception cells are present in the basic block B, as illustrated in portion (a) of FIG. 13, and a process of manufacturing the color filters of G is simplified, and crosstalk can be reduced.

Further, as illustrated in portion (b) of FIG. 13, the image sensor 418 includes unit blocks (four types of unit blocks B1 to B4) in which 3×3 light reception cells are assigned to each microlens 16a, and the adjacent unit blocks overlap in a range of one light reception cell.

As illustrated in portion (b) of FIG. 13, the eight surrounding light reception cells of the unit blocks B1 and B4 of which the center is the G light reception cell among the four unit blocks B1 to B4 include two R light reception cells, four G light reception cells, and two B light reception cells, the eight surrounding light reception cells of the unit block B2 of which the center is the R light reception cell include one R light reception cell, four G light reception cells, and three B light reception cells, and the eight surrounding light reception cells of the unit block B3 of which the center is the B light reception cell include three R light reception cells, four G light reception cells, and one B light reception cells and a color balance of the RGB light reception cells is lower than that in the first modification example of the second embodiment.

Third Embodiment of Imaging Device According to the Present Invention

Next, a third embodiment of an imaging device according to the present invention will be described with reference to FIG. 14. Since the imaging device of the third embodiment is different mainly in the multi-lens, the array lens, and the image sensor from those of the first and second embodiments, the difference will be hereinafter described.

First, as the multi-lens, the multi-lens by which a central pupil image 517a and an annular pupil image 517b illustrated in portion (b) of FIG. 14 are obtained is used in place of the multi-lens 12 by which the central pupil image 17a and the annular pupil image 17b illustrated in portion (a) of FIG. 14 are obtained. The multi-lens by which the central pupil image 517a and the annular pupil image 517b illustrated in portion (b) of FIG. 14 are obtained can be configured by shielding a portion of the annular optical system 14 of the multi-lens 12 illustrated in FIG. 3.

That is, the annular optical system corresponding to the annular pupil image 517b can be configured by forming partial openings in only four sides including up, down, left, and right sides and shielding other portions. Accordingly, the partially lacking annular pupil image 517b is obtained.

Further, four optical systems having the same characteristics as the annular optical system may be arranged only in surrounding portions on the up, down, left, and right sides of the central optical system (positions corresponding to the partial openings of the annular optical system) in place of the partial opening and a light shielding portion being formed for the annular optical system.

Meanwhile, the respective microlenses of the array lens are assumed to be arranged in a staggering manner with respect to the respective light reception cells 518a arranged in a lattice shape of an image sensor 518 as illustrated in portion (c) of FIG. 14. Further, the pupil image formed on the image sensor by the respective microlenses of the array lens is incident on 3×3 light reception cells.

Since this annular pupil image 517b lacks a portion overlapping the adjacent central pupil image 517a, the central pupil image 517a and the annular pupil image 517b do not overlap on the image sensor 518.

Meanwhile, each microlens of the array lens can be densely arranged in a staggering manner, and the assignment number of light reception cells of the image sensor assigned to each microarray lens of the array lens can be smaller than that in the second embodiment. That is, when the number of light reception cells of the image sensor is M and each of the number of pixels of the wide-angle image and the number of pixels of the telescopic image obtained from the image sensor is N, a ratio of the light reception cells number M and the number of pixels N is M:N=2:1.

Portion (d) of FIG. 14 is a diagram illustrating the color filter array arranged in the image sensor 518.

As illustrated in portion (d) of FIG. 14, in the color filter array arranged in the image sensor 518, 4×4 light reception cells are set as a basic block B (a block indicated by a bold frame in portion (d) of FIG. 14), and the basic block B is repeatedly arranged in a horizontal direction and a vertical direction.

Further, in this figure, the light reception cell indicated by the bold frame corresponds to the light reception cell at the center among the 3×3 light reception cells corresponding to one microlens.

An image of the group of light reception cells at the centers of the 3×3 light reception cells corresponding to the respective microlenses of the array lens that are arranged in a staggering manner is a mosaic image in which the light reception cells of RGB are arranged in a staggering manner. In the case of this example, in the mosaic image in which the light reception cells of RGB are arranged in a staggering manner, a G line in which the G light reception cells are continuously arranged in the horizontal direction, and BR lines in which the B light reception cells and the R light reception cells are alternately arranged are alternately arranged.

On the other hand, four light reception cells on upper, lower, left, and right sides between which the light reception cell at the center of the 3×3 light reception cells is interposed include light reception cells of RGB. That is, the light reception cells on upper and lower sides between which the G light reception cell at the center is interposed are the G light reception cells, and the light reception cells on left and right sides between which the G light reception cell at the center is interposed are the R light reception cells and the B light reception cell. Further, the light reception cells on upper and lower sides between which the R or B light reception cell at the center is interposed are the R light reception cell and the B light reception cell, and the light reception cells on left and right sides between which the R or B light reception cell at the center is interposed are the G light reception cells.

That is, the four light reception cells corresponding to the annular pupil image 517b in which partial openings are formed in only four sides including upper, lower, left, and right sides (portion (b) of FIG. 14) include one R light reception cell, two G light reception cells, and one B light reception cell such that the light reception cells of RGB are evenly assigned.

Accordingly, in a case in which the telescopic image is generated, it is possible to obtain the pixel signals in all of wavelength regions from the four light reception cells on the upper, lower, left, and right sides between which the light reception cell at the center among five light reception cells corresponding to one microlens is interposed.

Fourth Embodiment of Imaging Device According to the Present Invention

Next, a fourth embodiment of an imaging device according to the present invention will be described with reference to FIGS. 15 and 16. Further, since the imaging device of the fourth embodiment is different mainly in the multi-lens, the array lens, and the image sensor from those of the first, second, and third embodiments, the difference will be hereinafter described.

Figure 15:
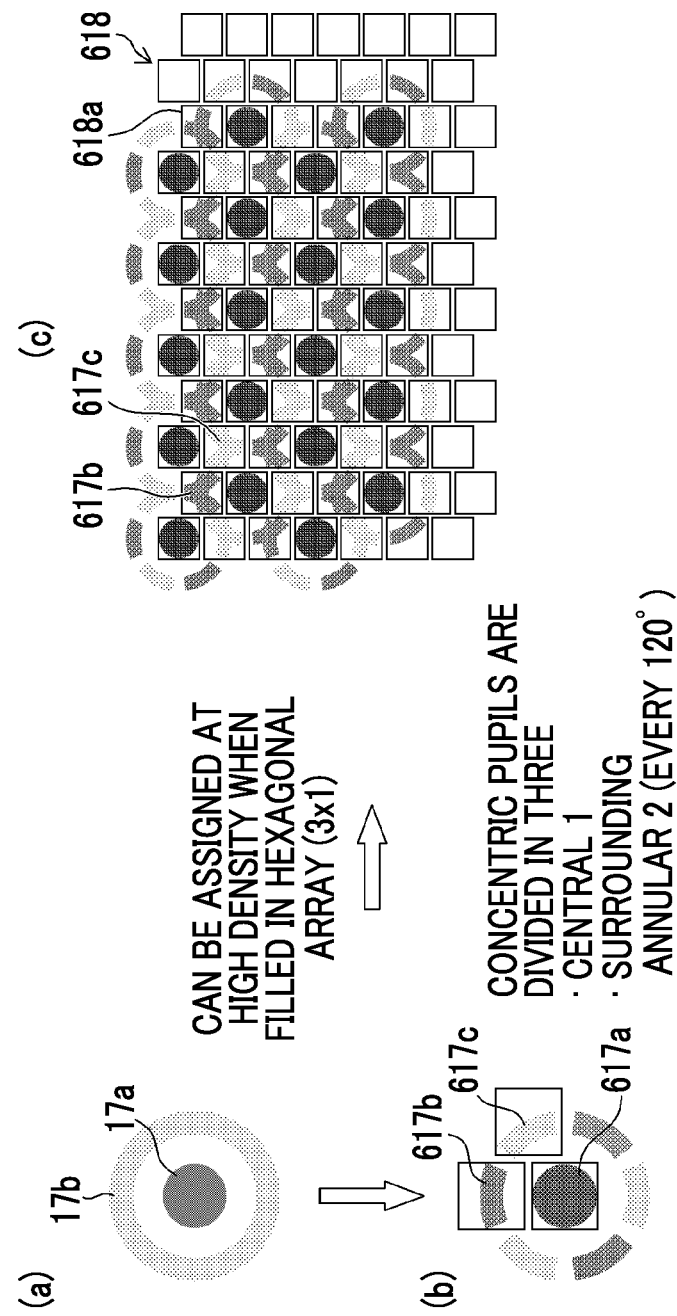
FIG. 15 is a diagram illustrating, for example, an imaging optical system, an array lens, and an image sensor used to describe a fourth embodiment of the imaging device according to the present invention.

First, as the multi-lens, a multi-lens by which a central pupil image 617a and annular pupil images 617b and 617c illustrated in portion (b) of FIG. 15 are obtained is used in place of the multi-lens 12 by which the central pupil image 17a and the annular pupil image 17b illustrated in portion (a) FIG. 15 are obtained.

In this case, in the annular optical system in the multi-lens including the central optical system and the annular optical system that are divided concentrically, partial openings are formed in only six sides having directions different by 60° around the central optical system corresponding to the central pupil image 617a. Further, the annular optical system includes two optical systems (a third optical system and a fourth optical system) arranged in the openings corresponding to the annular pupil image 617b and the annular pupil image 617c at three sides at 120°.

In the fourth embodiment, the central optical system corresponding to the central pupil image 617a is a wide-angle optical system, and the third optical system and the fourth optical system corresponding to the annular pupil image 617b and the annular pupil image 617c are two types of telescopic optical systems having different focal length, respectively.

Further, in the image sensor 618, light reception cells 618*a* are arranged in a hexagonal lattice shape, as illustrated in portion (c) of FIG. 15.

Meanwhile, the respective microlenses of the array lens are arranged in a staggering manner with respect to the respective light reception cells 618*a* arranged in a hexagonal lattice shape in the image sensor 618, and arranged in every one in a horizontal direction, and arranged in every two in a vertical direction, as illustrated in portion (c) of FIG. 15.

Each central pupil image 617*a* formed on the image sensor 618 by each microlens of the array lens is incident on one light reception cell corresponding to a center position of each microlens, and the annular pupil image 617*b* (first annular pupil image) and the annular pupil image 617*c* (second annular pupil image) are incident on six light reception cells (three light reception cells located in three directions at 120°×2) around the one light reception cell corresponding to the center position of each microlens.

While the annular pupil image 617*b* and the annular pupil image 617*c* overlap the adjacent annular pupil image 617*b* and the adjacent annular pupil image 617*c* on the image sensor 618 as illustrated in portion (c) of FIG. 15, the annular pupil image 617*b* and the annular pupil image 617*c* do not overlap each other.

When the number of light reception cells of the image sensor 618 is M and each of the numbers of pixels of the wide-angle image and the two telescopic images having different focal lengths obtained from the image sensor 618 is N, a ratio of the number of light reception cells M and the number of pixels N is M:N=3:1.

Further, in the fourth embodiment, a third optical system and a fourth optical system corresponding to the annular pupil image 617*b* and the annular pupil image 617*c* are two types of telescopic optical systems having different focal lengths, but are not limited thereto and may be, for example, two telescopic optical systems having different imaging distance (focus position).

Portions (a) to (f) of FIG. 16 are respective diagrams illustrating the color filter array arranged in the image sensor 618.

In the color filter array illustrated in portion (a) of FIG. 16, nine light reception cells illustrated in the upper left side are set as a basic block, and the basic block is repeatedly arranged in a horizontal direction and a vertical direction.

Further, in this figure, the light reception cell indicated by a bold frame corresponds to the light reception cell at the center among seven light reception cells (one light reception cell at the center and six surrounding light reception cells) corresponding to one microlens.

An image of the group of light reception cells at the centers among the seven light reception cells corresponding to each microlens of the array lens that are arranged in a staggering manner becomes a mosaic image in which the light reception cells of RGB are arranged in a staggering manner, and includes light reception cells of RGB on each line in the horizontal direction.

On the other hand, the light reception cells of RGB are assigned one by one to three light reception cells located in three directions at 120° corresponding to the annular pupil images 617*b* in three directions at 120° among the six light reception cells around the light reception cell at the center, and similarly, the light reception cells of RGB are assigned one by one to three light reception cells located in three directions at 120° corresponding to the annular pupil images 617*c* in three directions at 120°.

Accordingly, in a case in which two telescopic images are generated, it is possible to obtain the pixel signals in all of wavelength regions from the six surrounding light reception cells among the seven light reception cells corresponding to one microlens.

With the color filter array illustrated in portions (b) to (f) of FIG. 16, it is possible to obtain two sets of pixel signals of all the wavelength regions from the six surrounding light reception cells among the seven light reception cells corresponding to one microlens, similar to the color filter array illustrated in portion (a) of FIG. 16.

Second Embodiment of Imaging Optical System

Figure 17:
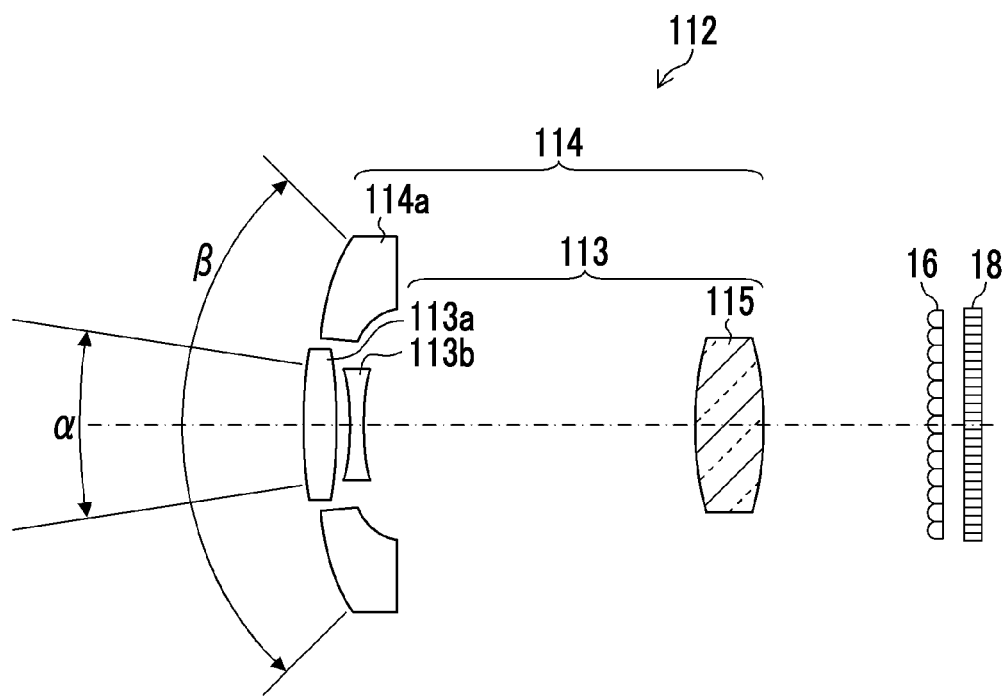
FIG. 17 is a sectional view illustrating a second embodiment of the imaging optical system that can be applied to the imaging device illustrated in FIG. 1.

FIG. 17 is a sectional view illustrating a second embodiment of the multi-lens that can be applied to the imaging device 10 (imaging module 11).

This multi-lens 112 includes a central optical system 113 in a central portion and an annular optical system 114 in a surrounding portion which are arranged on the same optical axis.

The central optical system 113 is a wide-angle optical system including a first lens 113*a*, a second lens 113*b*, and a common lens 115, and has an angle of view α.

The annular optical system 114 is a wide-angle optical system including a lens 114*a* and a common lens 115, and has an angle of view β (β>α). The annular optical system 114 has a wider angle than the central optical system 113.

This multi-lens 112 is different from the multi-lens 12 illustrated in FIG. 3 in that the reflective mirror is not used, the central optical system 113 is a telescopic optical system, and the annular optical system 114 is a wide-angle optical system.

Other embodiments of the imaging device 10 may include, for example, a mobile phone or a smartphone, a personal digital assistant (PDA), and a portable game machine that have a camera function. Hereinafter, an example in which the imaging device 10 is a smartphone will be described in detail with reference to the accompanying drawings.

<Configuration of Smartphone>

Figure 18:
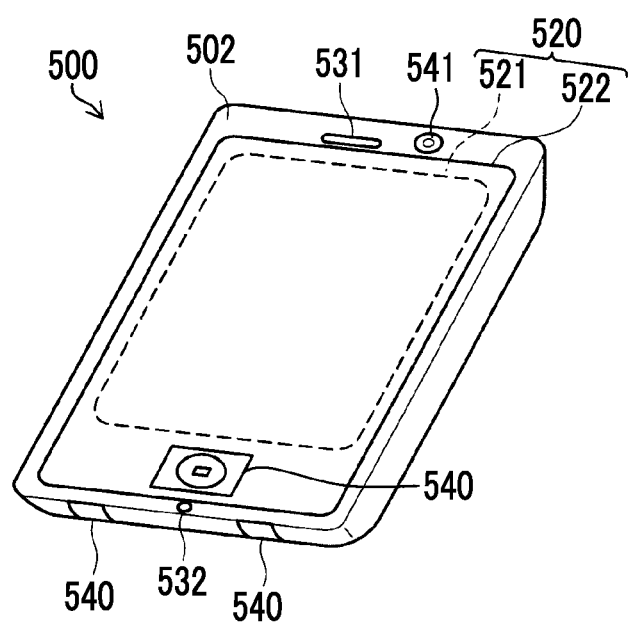
FIG. 18 is an appearance view of a smartphone according to another embodiment of the imaging device.

FIG. 18 illustrates an appearance of a smartphone 500 according to another embodiment of the imaging device 10. The smartphone 500 illustrated in FIG. 18 includes a plate-shaped casing 502, and includes a display and input unit 520 in which a display panel 521 which is a display unit and an operation panel 522 which is an input unit are integrated on one surface of the casing 502. Further, the casing 502 includes a speaker 531, a microphone 532, an operation unit 540, and a camera unit 541. Further, the configuration of the casing 502 is not limited thereto and, for example, the display unit and the input unit may adopt independent configurations or may adopt a configuration having a folding structure and a sliding structure.

Figure 19:
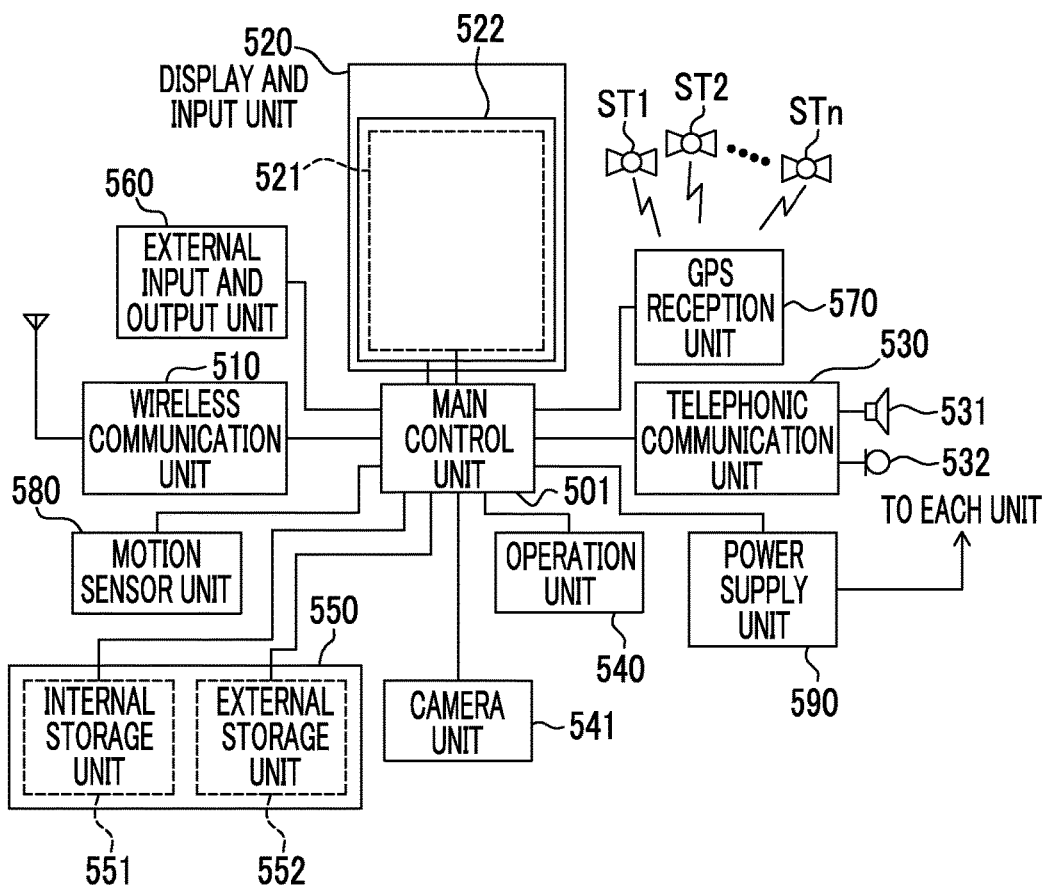
FIG. 19 is a block diagram illustrating a configuration of primary units of a smartphone.
Figure 20:
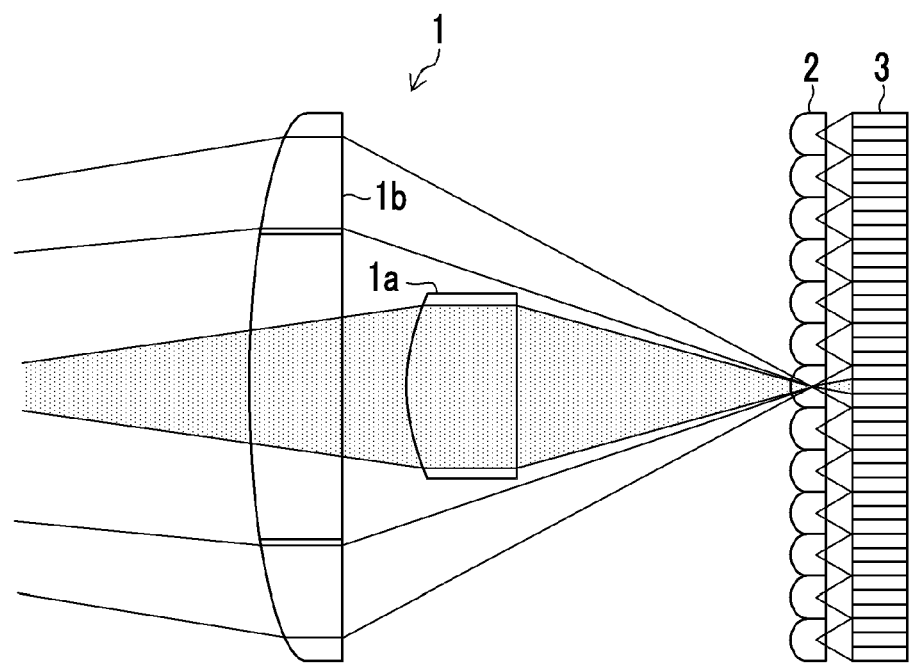
FIG. 20 is a diagram illustrating a conventional imaging device comprising an imaging optical system including a central optical system and an annular optical system, an array lens, and an image sensor.
Figure 21:
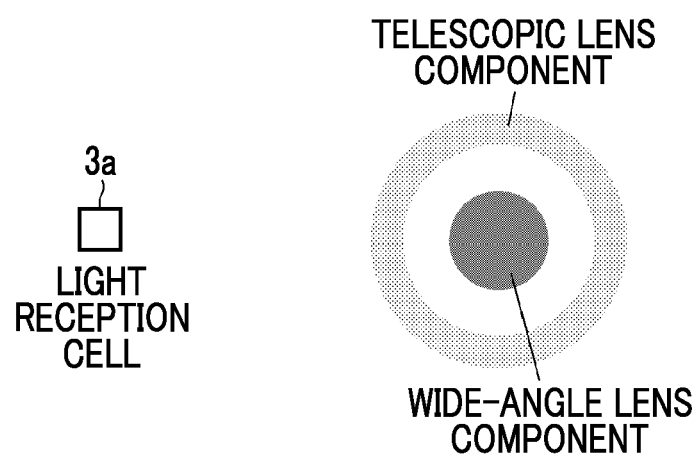
FIG. 21 is a diagram illustrating a relationship between one light reception cell and a pupil image.
Figure 22:
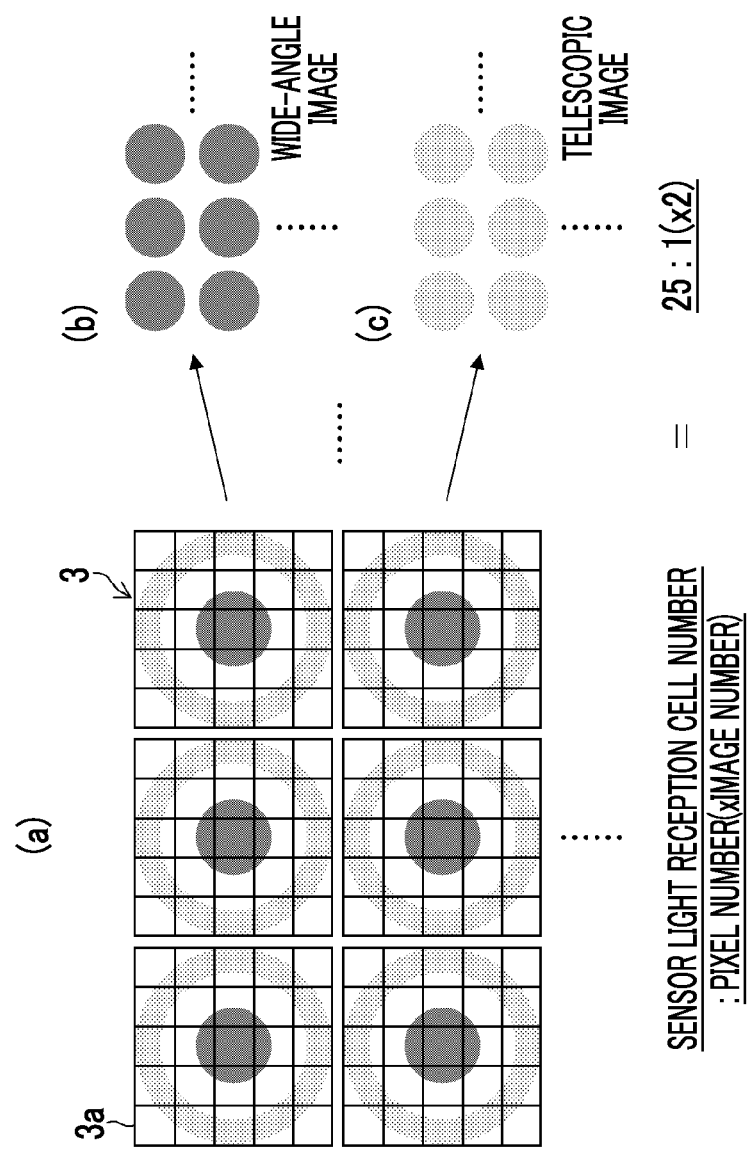
FIG. 22 is a diagram illustrating an example of each pupil image formed on a conventional image sensor.
Figure 23:
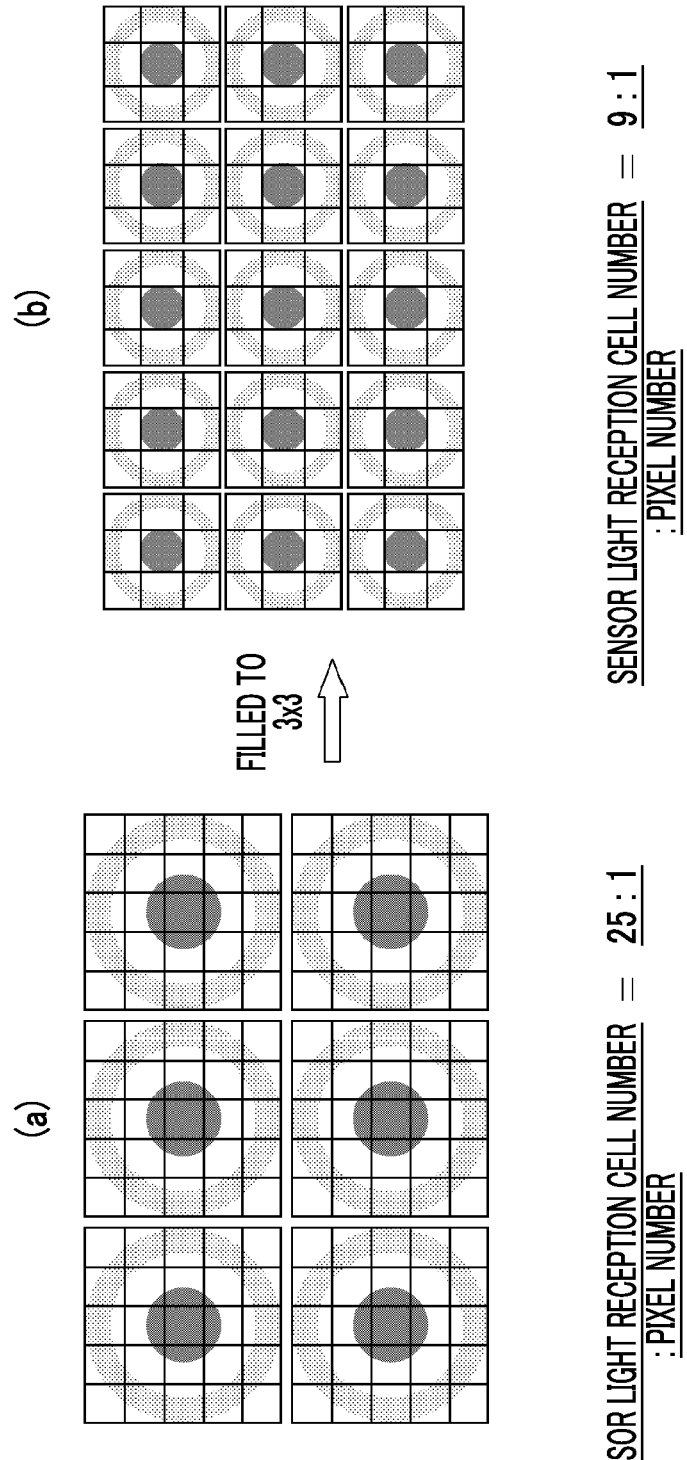
FIG. 23 is a diagram illustrating another example of each pupil image formed on the conventional image sensor.

FIG. 19 is a block diagram illustrating a configuration of a smartphone 500 illustrated in FIG. 18. As illustrated in FIG. 19, main components of the smartphone 500 include a wireless communication unit 510, a display and input unit 520, a telephonic communication unit 530, an operation unit 540, a camera unit 541, a storage unit 550, an external input and output unit 560, a global positioning system (GPS) reception unit 570, a motion sensor unit 580, a power supply unit 590, and a main control unit 501. Further, a main function of the smartphone 500 includes a wireless communication function of performing mobile wireless communication via a base station device BS and a mobile communication network NW.

The wireless communication unit 510 performs wireless communication with the base station device BS accommodated in the mobile communication network NW according to an instruction of the main control unit 501. Using this wireless communication, the wireless communication unit 510 performs transmission and reception of various file data such as voice data and image data, e-mail data, or the like, or reception of Web data, streaming data, or the like.

The display and input unit 520 is a so-called touch panel that displays an image (a still image and a video), text information, or the like to visually deliver information to the user, and detects a user operation with respect to the displayed information, under control of the main control unit 501, and includes a display panel 521, and an operation panel 522. In a case in which a generated 3D image is viewed, it is preferable for the display panel 521 to be a 3D display panel.

The display panel 521 uses a liquid crystal display (LCD), an organic electro-luminescence display (OELD), or the like as a display device.

The operation panel 522 is a device that is placed such that an image displayed on a display surface of the display panel 521 is visible, and detects one or a plurality of coordinates operated by a finger of a user or a stylus. When this device is operated by the finger of the user or the stylus, a detection signal generated due to the operation is output to the main control unit 501. Then, the main control unit 501 detects an operation position (coordinates) on the display panel 521 based on the received detection signal.

The display panel 521 and the operation panel 522 of the smartphone 500 are formed integrally with each other to constitute the display and input unit 520 as illustrated in FIG. 18, but the operation panel 522 is arranged to completely cover the display panel 521. In a case in which this arrangement is adopted, the operation panel 522 may have a function of detecting a user operation in an area other than the display panel 521. In other words, the operation panel 522 may include a detection area (hereinafter referred to as a display area) for an overlapping portion overlapping the display panel 521, and another detection area (hereinafter referred to as a non-display area) for an outer edge portion not overlapping the display panel 521.

Further, a size of the display area may completely match a size of the display panel 521, but both do not necessarily have to match each other. Further, the operation panel 522 may include two sensitive areas including an outer edge portion and an inner portion other than the outer edge portion. Further, a width of the outer edge portion is appropriately designed according to a size of the casing 502. Furthermore, a position detection scheme employed in the operation panel 522 may include a matrix switch scheme, a resistance film scheme, a surface acoustic wave scheme, an infrared scheme, an electromagnetic induction scheme, a capacitive scheme, and the like, and any of the schemes may be adopted.

The telephonic communication unit 530 includes a speaker 531 or a microphone 532. The telephonic communication unit 530 converts user's voice input through the microphone 532 into audio data that can be processed by the main control unit 501 and outputs the audio data to the main control unit 501 or decodes audio data received by the wireless communication unit 510 or the external input and output unit 560 and outputs the resultant audio data from the speaker 531. Further, as illustrated in FIG. 18, for example, the speaker 531 and the microphone 532 can be mounted on the same surface as the surface on which the display and input unit 520 is provided.

The operation unit 540 includes hardware keys using key switches or the like, and receives an instruction from the user. For example, the operation unit 540 is mounted on a lower surface under the display unit of the casing 502 of the smartphone 500, and is a push button type of switches which are turned on when pressed with a finger and turned off due to restoring force of a spring or the like when the finger is separated.

The storage unit 550 stores a control program or control data of the main control unit 501, address data associated with a name or a telephone number of a communication party, data of a transmitted or received e-mail, Web data downloaded by Web browsing, and downloaded content data, and temporarily stores streaming data or the like. Further, the storage unit 550 includes an internal storage unit 551 built in a smartphone, and an external storage unit 552 having a freely removable external memory slot. Further, each of the internal storage unit 551 and the external storage unit 552 constituting the storage unit 550 is implemented using a storage medium such as a flash memory type, hard disk type, multimedia card microtype, or card type memory (for example, MicroSD (registered trademark) memory), a random access memory (RAM), or a read only memory (ROM).

The external input and output unit 560 serves as an interface with all external devices connected to the smartphone 500, and is intended for direct or indirect connection to another external device through communication or the like (for example, Universal Serial Bus (USB) or IEEE1394) or a network (for example, the Internet, a wireless LAN, Bluetooth (registered trademark), RFID (Radio Frequency Identification), infrared communication (Infrared Data Association: IrDA) (registered trademark), UWB (Ultra Wideband) (registered trademark), Zigbee (registered trademark)).

Examples of the external device connected to the smartphone 500 include a wired/wireless headset, a wired/wireless external charger, a wired/wireless data port, a memory card connected via a card socket, an SIM (Subscriber Identity Module Card)/UIM (User Identity Module Card) card, an external audio and video device connected via audio and video I/O (Input/Output) terminals, a wirelessly connected external audio-video device, a wiredly/wirelessly connected smartphone, a wiredly/wirelessly connected personal computer, a wiredly/wirelessly connected PDA, and an earphone. The external input and output unit can transfer data received from such an external device to each component inside the smartphone 500 or can transfer internal data of the smartphone 500 to the external device.

According to an instruction of the main control unit 501, the GPS reception unit 570 receives GPS signals transmitted from GPS satellites ST1 to STn and executes a positioning calculation process based on a plurality of received GPS signals to detect a position including a latitude, a longitude, and an altitude of the smartphone 500. When the GPS reception unit 570 can acquire position information from the wireless communication unit 510 or the external input and output unit 560 (for example, wireless LAN), the GPS reception unit 570 can also detect the position using the position information.

The motion sensor unit 580 includes, for example, a three-axis acceleration sensor. According to an instruction of the main control unit 501, the motion sensor unit 580 detects a physical motion of the smartphone 500. By detecting the physical motion of the smartphone 500, a direction and an acceleration of movement of the smartphone 500 are detected. A result of this detection is output to the main control unit 501.

The power supply unit 590 supplies power accumulated in a battery (not illustrated) to each unit of the smartphone 500 according to the instruction of the main control unit 501.

The main control unit 501 includes a microprocessor. The main control unit 501 operates according to the control program or the control data stored in the storage unit 550, and generally controls the respective units of the smartphone 500. Further, the main control unit 501 has a mobile communication control function of controlling each unit of a communication system and an application processing function in order to perform voice communication or data communication via the wireless communication unit 510.

The application processing function is realized by the main control unit 501 operating according to application software stored in the storage unit 550. Examples of the application processing function includes an infrared communication function of controlling the external input and output unit 560 and performing communication with a party device, an e-mail function of performing transmission and reception of an e-mail, and a Web browsing function of browsing Web pages.

Further, the main control unit 501 has an image processing function of, for example, displaying an image on the display and input unit 520 based on image data (data of a still image or a video) such as received data or downloaded streaming data. The image processing function refers to a function by which the main control unit 501 decodes the image data, performs image processing on a result of the decoding, and displays an image on the display and input unit 520.

Further, the main control unit 501 executes display control for the display panel 521, and operation detection control for detecting a user operation through the operation unit 540 and the operation panel 522.

Through execution of the display control, the main control unit 501 displays an icon for starting up the application software or a software key such as a scroll bar, or displays a window for creating the e-mail. Further, the scroll bar refers to a software key for receiving an instruction to move a display portion of the image for a large image that cannot be accommodated in the display area of the display panel 521.

Further, through execution of the operation detection control, the main control unit 501 detects a user operation through the operation unit 540, receives an operation of the icon or an input of a character string to an input field of the window through the operation panel 522, or receives a request for scroll of a displayed image through the scroll bar.

Moreover, through execution of the operation detection control, the main control unit 501 has a touch panel control function of determining whether the operation position with respect to the operation panel 522 is an overlapping portion (display area) overlapping the display panel 521 or the outer edge portion (non-display area) not overlapping the display panel 521, other than the overlapping portion, and controlling the sensitive area of the operation panel 522 or a display position of the software key.

Further, the main control unit 501 may detect a gesture operation with respect to the operation panel 522, and execute a preset function according to the detected gesture operation. The gesture operation is not a conventional simple touch operation, but refers to an operation of drawing a locus for at least one of a plurality of positions by drawing a locus using a finger or the like, simultaneously designating a plurality of positions, or combining them.

The camera unit 541 is a digital camera that performs electronic imaging using an imaging element such as a complementary metal oxide semiconductor (CMOS) or a charge coupled device (CCD). The imaging device 10 (or the imaging module 11) described above can be applied to this camera unit 541. The camera unit 541 can capture the wide-angle image and the telescopic image without requiring mechanical switching mechanism or the like, and is suitable as a camera unit incorporated in a thin portable terminal such as the smartphone 500.

Further, the camera unit 541 can convert image data obtained by imaging into, for example, compressed image data such as a joint photographic coding experts group (JPEG) under control of the main control unit 501, and record the compressed image data in the storage unit 550 or output the compressed image data via the external input and output unit 560 or the wireless communication unit 510. In the smartphone 500 illustrated in FIG. 18, the camera unit 541 is mounted on the same surface as the display and input unit 520, but a mounting position of the camera unit 541 is not limited thereto, and the camera unit 541 may be mounted on a back surface of the display and input unit 520 or a plurality of camera units 541 may be mounted. Further, in a case in which the plurality of camera units 541 are mounted, imaging can be performed using one switched camera unit 541 provided for imaging, or imaging can be performed simultaneously using the plurality of camera units 541.

Further, the camera unit 541 can be used for various functions of the smartphone 500. For example, it is possible to display the image acquired by the camera unit 541 on the display panel 521 or use the image of the camera unit 541 as one of operation inputs of the operation panel 522. Further, when the GPS reception unit 570 detects the position, it is possible to detect the position by referring to the image from the camera unit 541. Further, it is possible to determine an optical axis direction of the camera unit 541 of the smartphone 500 or determine a current usage environment without using a 3-axis acceleration sensor or in combination with the 3-axis acceleration sensor by referring to the image from the camera unit 541. Of course, it is also possible to use the image from the camera unit 541 within application software.

[Others]

While the light reception cells of three colors of RGB are assigned to each microlens as the pixel in each wavelength region for generating at least one of the simultaneously captured images having different characteristics in the present embodiment, light reception cells of two colors may be assigned to each microlens since the color image sensor that obtains one output from a plurality of wavelengths includes an image sensor of two colors, as well as the color image sensor of three colors (for example, RGB).

Although the number of identifications is smaller than the three colors, the two colors may be sufficient in some uses since the configuration is simplified. In this case, one type of image output is obtained from color signals (color information) in two wavelength regions.

Therefore, a minimum configuration of the present invention is a configuration in which one microlens is assigned to Y (Y=3) pixels, X (X=2) light reception cells having different sensing wavelength regions are assigned to a first group to detect two types of wavelengths (two-color sensing), and one light reception cell is assigned to a second group to detect one type of wavelength. Accordingly, the effective data sampling number of the first group (two-color sensing) can be equal to the number of microlenses, and the sampling number of the second group can also be equal to the number of microlenses.

Further, as the light reception cells that output pixel signals in the respective wavelength regions for generating one image, reception cells having color filters corresponding to other colors such as transparent color (white) or emerald color may be assigned in place of any of the light reception cells of RGB or in addition to the light reception cells of RGB. Further, a reception cell having a filter that cuts visible light and transmits only infrared light may also be assigned. Accordingly, it is possible to acquire an infrared image.

Further, one of the central optical system and the annular optical system in the multi-lens of the present embodiment is a wide-angle optical system, and the other is a telescopic optical system, but the present invention is not limited thereto. For example, application of various optical systems such as two types of optical systems having different focal lengths or two types of optical systems having different spatial frequency characteristics (blur) may be considered.

Further, in the present embodiment, the multi-lens in which the plurality of optical systems having different characteristics are concentrically divided has been used as the multi-lens, but the present invention is not limited thereto. The multi-lens may be an imaging optical system divided in 4 in up and down directions or divided in 4 in up, down, left, and right directions.

Further, the reflective mirror in a reflective mirror type of lens configuration of the multi-lens 12 illustrated in FIG. 3 is not limited to a concave mirror or a convex mirror and may be a plane mirror. Further, the number of reflective mirrors is not limited to two, and three or more reflective mirrors may be provided.

Further, a moving mechanism that moves the common lens of the central optical system and the annular optical system or the image sensor in the optical axis direction may be provided so as to perform focus adjustment.

Further, in the present embodiment, the array lens 16 is used as the pupil division device, but the present invention is not limited thereto, providing a pin hole in a position of each microlens 16a of the array lens 16 and causing the pupil image of the multi-lens to be incident on the plurality of light reception cells by the pinholes, or causing light beams passing through respective areas having different characteristics of the multi-lens to be incident on different light reception cells by the microlenses and light shielding masks provided in the respective light reception cells (for example, JP2012-253670A) can be applied.

Further, it is understood that the present invention is not limited to the above-described embodiments, and various modifications can be made without departing from the spirit of the present invention.

What is claimed is:

1. An imaging module that simultaneously captures X subject images having different characteristics, and outputs pixel signals in a plurality of wavelength regions for at least one of the X subject images, where X is an integer equal to or greater than 2, the imaging module comprising:
a multi-lens that has X areas on which subject light is incident, and causes the subject images having different characteristics to be formed to overlap in a same image plane in each of the X areas;
a pupil division device configured to divide a pupil image of the multi-lens into the respective X areas; and
Y photoelectric converters arranged corresponding to X light reception areas that respectively receive X pupil images divided by the pupil division device, where Y is an integer equal to or greater than X+1, wherein:
a plurality of photoelectric converters are arranged in at least one of the X light reception areas,
the plurality of photoelectric converters arranged in the light reception area output the pixel signals in the plurality of wavelength regions,
the pupil division device is an array lens including two-dimensionally arranged microlenses, the array lens being arranged on the incidence surface side of the photoelectric converters and causing the pupil image of the multi-lens to be incident on the Y photoelectric converters by the respective microlenses, and
the array lens causes pupil images adjacent to each other among the pupil images of a same one of the X areas of the multi-lens and respectively incident on the photoelectric converters due to the respective microlenses to partially overlap on the photoelectric converters.

2. The imaging module according to claim 1,
wherein the multi-lens includes a first optical system at a center, and a second optical system provided in a portion surrounding the first optical system and having different characteristics from the first optical system.

3. The imaging module according to claim 2,
wherein one of the first optical system and the second optical system in the multi-lens is a wide-angle optical system, and the other is a telescopic optical system.

4. The imaging module according to claim 2,
wherein the first optical system of the multi-lens is a circular central optical system, and the second optical system is an annular optical system concentrically arranged with respect to the central optical system.

5. The imaging module according to claim 4,
wherein the annular optical system includes a reflective optical system that reflects a light beam twice or more.

6. The imaging module according to claim 1,
wherein the multi-lens includes a first optical system at a center, and a second optical system provided in a portion surrounding the first optical system and having different characteristics from the first optical system,
when the pupil division device and the Y photoelectric converters are set as a unit block, the unit block includes 3×3 photoelectric converters arranged in a lattice shape,
the first optical system of the multi-lens is a circular central optical system, and the second optical system is an annular optical system arranged concentrically with respect to the central optical system,
a central pupil image corresponding to the first optical system is incident on one of the photoelectric converters at a center of the unit block,
an annular pupil image corresponding to the second optical system is incident on eight of the photoelectric converters surrounding the center of the unit block, and
an image sensor is configured such that 4×4 photoelectric converters arranged in a lattice shape are set as a basic block, and the basic block is repeatedly arranged in a horizontal direction and a vertical direction.

7. An imaging device, comprising:
the imaging module according to claim 1; and
an image generation unit that generates an image signal corresponding to one pixel constituting at least one image composed of information of the plurality of wavelength regions based on pixel signals output from photoelectric converters in a unit block when the pupil division device and the Y photoelectric converters are set as the unit block.

8. An imaging module that simultaneously captures X subject images having different characteristics, and outputs pixel signals in a plurality of wavelength regions for at least one of the X subject images, where X is an integer equal to or greater than 2, the imaging module comprising:
- a multi-lens that has X areas on which subject light is incident, and causes the subject images having different characteristics to be formed to overlap in a same image plane in each of the X areas;
- a pupil division device configured to divide a pupil image of the multi-lens into the respective X areas; and
- Y photoelectric converters arranged corresponding to X light reception areas that respectively receive X pupil images divided by the pupil division device, where Y is an integer equal to or greater than X+1, wherein:
- a plurality of photoelectric converters are arranged in at least one of the X light reception areas,
- the plurality of photoelectric converters arranged in the light reception area output the pixel signals in the plurality of wavelength regions,
- the pupil division device is an array lens including two-dimensionally arranged microlenses, the array lens being arranged on the incidence surface side of the photoelectric converters and causing the pupil image of the multi-lens to be incident on the Y photoelectric converters by the respective microlenses,
- the multi-lens includes a first optical system at a center, and a second optical system provided in a portion surrounding the first optical system and having different characteristics from the first optical system,
- the first optical system of the multi-lens is a circular central optical system, and the second optical system is the annular optical system arranged concentrically with respect to the central optical system,
- the array lens causes annular pupil images corresponding to the annular optical systems adjacent to each other among the pupil images of a same one of the X areas of the multi-lens and respectively formed on the Y photoelectric converters by the respective microlenses to partially overlap on the Y photoelectric converters, and causes the central pupil image corresponding to the central optical system and the annular pupil image corresponding to the second optical system adjacent to each other to partially overlap, and
- the annular optical system is formed such that a portion corresponding to a portion of the annular pupil image overlapping the central pupil image corresponding to the central optical system is shielded or a portion corresponding to a portion of the annular pupil image overlapping the central pupil image corresponding to the central optical system lacks.

9. The imaging module according to claim 8, wherein the annular optical system includes a reflective optical system that reflects a light beam twice or more.

10. An imaging device, comprising:
the imaging module according to claim 8; and
an image generation unit that generates an image signal corresponding to one pixel constituting at least one image composed of information of the plurality of wavelength regions based on pixel signals output from photoelectric converters in a unit block when the pupil division device and the Y photoelectric converters are set as the unit block.

11. An imaging module that simultaneously captures X subject images having different characteristics, and outputs pixel signals in a plurality of wavelength regions for at least one of the X subject images, where X is an integer equal to or greater than 2, the imaging module comprising:
- a multi-lens that has X areas on which subject light is incident, and causes the subject images having different characteristics to be formed to overlap in a same image plane in each of the X areas;
- a pupil division device configured to divide a pupil image of the multi-lens into the respective X areas; and
- Y photoelectric converters arranged corresponding to X light reception areas that respectively receive X pupil images divided by the pupil division device, where Y is an integer equal to or greater than X+1, wherein:
- a plurality of photoelectric converters are arranged in at least one of the X light reception areas,
- the plurality of photoelectric converters arranged in the light reception area output the pixel signals in the plurality of wavelength regions,
- the pupil division device is an array lens including two-dimensionally arranged microlenses, the array lens being arranged on the incidence surface side of the photoelectric converters and causing the pupil image of the multi-lens to be incident on the Y photoelectric converters by the respective microlenses,
- the multi-lens includes a first optical system at a center, and a second optical system provided in a portion surrounding the first optical system and having different characteristics from the first optical system,
- the first optical system of the multi-lens is a circular central optical system, and the second optical system is an annular optical system that is concentrically arranged with respect to the central optical system and in which a third optical system and a fourth optical system having different characteristics are alternately arranged, and
- the array lens causes first annular pupil images corresponding to the third optical systems of the annular optical systems adjacent to each other among the pupil images of a same one of the X areas of the multi-lens and respectively formed on the Y photoelectric converters by the respective microlenses to overlap on the Y photoelectric converters, and causes second annular pupil images corresponding to the fourth optical systems of the annular optical systems adjacent to each other to overlap on the Y photoelectric converters.

12. The imaging module according to claim 11, wherein the central optical system of the multi-lens is a wide-angle optical system, and the third optical system and the fourth optical system of the annular optical system are telescopic optical systems having different focal lengths.

13. The imaging module according to claim 11, wherein the central optical system of the multi-lens is a wide-angle optical system, and the third optical system and the fourth optical system of the annular optical system are telescopic optical systems having different imaging distances.

14. The imaging module according to claim 11, wherein the annular optical system includes a reflective optical system that reflects a light beam twice or more.

15. An imaging device, comprising:
the imaging module according to claim 11; and
an image generation unit that generates an image signal corresponding to one pixel constituting at least one image composed of information of the plurality of wavelength regions based on pixel signals output from photoelectric converters in a unit block when the pupil division device and the Y photoelectric converters are set as the unit block.

16. The imaging module according to claim 11, wherein the photoelectric converters are arranged in a hexagonal lattice shape, when the pupil division device and the Y photoelectric converters are set as a unit block, the unit block includes one central photoelectric converter and six surrounding photoelectric converters, and a central pupil image corresponding to the central optical system is incident on the central photoelectric converter, a first annular pupil image corresponding to the third optical system of the annular optical system is incident on the three photoelectric converters in three directions at 120° from the central photoelectric converter among the six surrounding photoelectric converters, and a second annular pupil image corresponding to the fourth optical system of the annular optical system is incident on the three other photoelectric converters in three directions at 120° from the central photoelectric converter among the six surrounding photoelectric converters.

17. The imaging module according to claim 16,
wherein the central optical system of the multi-lens is a wide-angle optical system, and the third optical system and the fourth optical system of the annular optical system are telescopic optical systems having different focal lengths.

18. The imaging module according to claim 16,
wherein the central optical system of the multi-lens is a wide-angle optical system, and the third optical system and the fourth optical system of the annular optical system are telescopic optical systems having different imaging distances.

19. The imaging module according to claim 16,
wherein the annular optical system includes a reflective optical system that reflects a light beam twice or more.

20. An imaging device, comprising:
the imaging module according to claim 16; and
an image generation unit that generates an image signal corresponding to one pixel constituting at least one image composed of information of the plurality of wavelength regions based on pixel signals output from photoelectric converters in a unit block when the pupil division device and the Y photoelectric converters are set as the unit block.

* * * * *